US009835864B2

(12) United States Patent
Morifuji et al.

(10) Patent No.: US 9,835,864 B2
(45) Date of Patent: Dec. 5, 2017

(54) IMAGE DISPLAY APPARATUS AND METHOD FOR DISPLAYING IMAGE

(71) Applicant: Sony Corporation, Tokyo (JP)

(72) Inventors: Takafumi Morifuji, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 14/415,316

(22) PCT Filed: Jul. 17, 2013

(86) PCT No.: PCT/JP2013/069378
§ 371 (c)(1),
(2) Date: Jan. 16, 2015

(87) PCT Pub. No.: WO2014/017348
PCT Pub. Date: Jan. 30, 2014

(65) Prior Publication Data
US 2015/0198808 A1 Jul. 16, 2015

(30) Foreign Application Priority Data

Jul. 24, 2012 (JP) ................................. 2012-163324

(51) Int. Cl.
*G02B 27/01* (2006.01)
*G09G 5/38* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC ............ G02B 27/0172; G02B 27/0179; G02B 27/0093; G02B 2027/0187; G02B 2027/0178; G09G 5/38
See application file for complete search history.

(56) References Cited

U.S. PATENT DOCUMENTS 5,714,967 A 2/1998 Okamura et al.
5,886,823 A * 3/1999 Sugano .............. G02B 27/0018
359/630
(Continued)

FOREIGN PATENT DOCUMENTS

JP 07-311361 A 11/1995
JP 2002-328330 A 11/2002
(Continued)

*Primary Examiner* — Shaheda Abdin
(74) *Attorney, Agent, or Firm* — Chip Law Group

(57) ABSTRACT

It is made possible to correct a positional gap between an optical system and an eye of an observer appropriately. Based on an eyeball position of the eye of the observer, a positional relationship between the optical system, which leads an image displayed on a display element to the eye of the observer, and the eye of the observer, that is, a positional gap therebetween is detected. Based on the positional relationship detected in such a manner, the positional relationship between the optical system and the eye of the observer is corrected. For example, the positional gap is electronically corrected by performing shift control of a position of the image displayed on the display element. Also, for example, the positional gap is mechanically corrected by performing shift control of the optical system including the display element.

14 Claims, 13 Drawing Sheets

(51) Int. Cl.
*H04N 13/04* (2006.01)
*G09G 3/00* (2006.01)
*G02B 27/00* (2006.01)
*H04N 5/64* (2006.01)

(52) U.S. Cl.
CPC ......... *G02B 27/0179* (2013.01); *G09G 3/003* (2013.01); *G09G 5/38* (2013.01); *H04N 13/044* (2013.01); *H04N 13/0479* (2013.01); *G02B 27/0068* (2013.01); *G02B 2027/0178* (2013.01); *G02B 2027/0187* (2013.01); *G09G 2340/0464* (2013.01); *G09G 2354/00* (2013.01); *H04N 5/64* (2013.01)

(56) References Cited

U.S. PATENT DOCUMENTS

| | | | |
|---|---|---|---|
| 2001/0030715 A1* | 10/2001 | Tabata | G02B 27/0172 349/15 |
| 2010/0097580 A1 | 4/2010 | Yamamoto et al. | |
| 2012/0044571 A1* | 2/2012 | Mukawa | G02B 27/0103 359/630 |

FOREIGN PATENT DOCUMENTS

| | | |
|---|---|---|
| JP | 2003-279882 A | 10/2003 |
| JP | 2005-311754 A | 11/2005 |
| JP | 2009-116196 A | 5/2009 |
| JP | 2012-042654 A | 3/2012 |
| WO | WO 2009/066475 A1 | 5/2009 |

* cited by examiner

FIG. 13
(a) 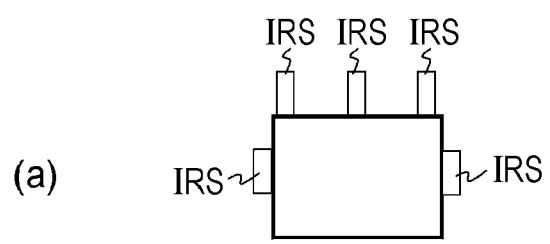
(b) 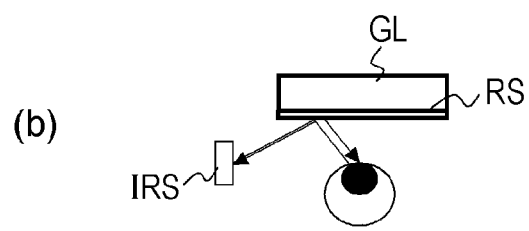
(c) 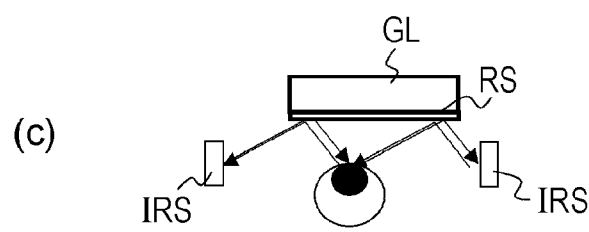

IMAGE DISPLAY APPARATUS AND METHOD FOR DISPLAYING IMAGE

TECHNICAL FIELD

The present technique relates to an image display apparatus and a method for displaying an image and specifically relates, for example, to an image display apparatus such as a head-mounted display configured to lead an image displayed on a display element to an eye of an observer by a magnification optical system.

BACKGROUND ART

Recently, a head-mounted display (HMD) mounted to a head of a user has been known. Theoretically, the head-mounted display includes a configuration to magnify an image displayed on a small display element with a magnification optical system and to lead the image to an eye of an observer. That is, the head-mounted display is configured to optically magnify an image displayed on a display element and to make a user observe the image as a magnified virtual image.

For example, as illustrated in FIG. 14(a), in such a head-mounted display, when a gap is generated between a center of an optical system and a position of an eye of an observer, a video image influences a conformable image observation. In this case, for example, according to a gap amount, a color shift is caused, contrast is decreased, or image distortion is caused. Note that in FIG. 14(b), a case where there is no gap between a center of the optical system and a position of the eye of the observer is illustrated.

For example, in Patent Document 1, a head-mounted display in which an optical system is configured in a movable manner and a positional gap between an eye of an observer and the optical system can be corrected by a manual movement adjustment of the optical system by the observer has been proposed.

CITATION LIST

Patent Document

Patent Document 1: JP 2009-116196 A

SUMMARY OF THE INVENTION

Problems to be Solved by the Invention

In the correction technique described in Patent Document 1, there has been no way for an observer to know an amount of a positional gap between an eye of the observer and an optical system and it has been difficult to perform movement adjustment of the optical system to an optimal position.

A purpose of the present technique is to make it possible to perform correction of a positional gap between an optical system and an eye of an observer appropriately.

Solutions to Problems

A concept of the present technique is an image display apparatus including a positional relationship detecting unit configured to detect a positional relationship between an optical system, which leads an image displayed on a display element to an eye of an observer, and the eye of the observer based on an eyeball position of the eye of the observer, and a positional relationship correcting unit configured to correct the positional relationship between the optical system and the eye of the observer based on the positional relationship detected by the positional relationship detecting unit.

In the present technique, by the positional relationship detecting unit, a positional relationship between an optical system, which leads an image displayed on a display element to an eye of an observer, and the eye of the observer is detected. The image displayed on the display element is lead to the eye of the observer by the optical system. Accordingly, the image displayed on the display element is optically magnified and is observed as a magnified virtual image by the observer. For example, as the optical system, there may be a first optical system to lead a left-eye image displayed on the display element to a left eye of the observer and a second optical system to lead a right-eye image displayed on the display element to a right eye of the observer. For example, an optical system to lead an image displayed on the display element to the eye of the observer may be further included.

For example, an eyeball position estimating unit to estimate an eyeball position of the eye of the observer may be further included and the positional relationship detecting unit may detect a positional relationship between the optical system and the eye of the observer based on the eyeball position estimated by the eyeball position estimating unit. The estimation of the eyeball position may be performed, for example, by application of a sclera reflection method, an electro-oculogram (EOG) method, a facial recognition technique, or the like. By the positional relationship detecting unit, a positional relationship between the optical system and the eye of the observer is detected based on the estimated eyeball position.

By the positional relationship correcting unit, a positional relationship between the optical system and the eye of the observer is corrected based on the positional relationship detected by the positional relationship detecting unit. For example, based on the positional relationship detected by the positional relationship detecting unit, the positional relationship correcting unit may shift a display position of the image displayed on the display element. Also, for example, the positional relationship correcting unit may move the optical system based on the positional relationship detected by the positional relationship detecting unit.

Also, for example, the positional relationship correcting unit may include a positional relationship presenting unit to present, to the observer, the positional relationship detected by the positional relationship detecting unit, and a control unit to control the positional relationship between the optical system and the eye of the observer according to operation by the observer.

For example, in this case, according to operation by the observer, the control unit may perform shift control of a display position of the image displayed on the display element. Also, for example, in this case, the control unit may perform movement control of the optical system according to operation by the observer.

Also, for example, in this case, the positional relationship presenting unit may display, on the display element, the positional relationship detected by the positional relationship detecting unit. In this case, for example, a gap between the optical system and the eye of the observer may be displayed as a gauge, a character, or the like. Also, in this case, for example, an operation method of a remote-control apparatus to reduce the gap may be displayed. Note that display of the positional relationship may be displayed on a display element which is different from the above-described display element. Also, presentation of the positional relationship may be performed by sound, vibration, or increasing/decreasing intensity of light emission.

In such a manner, in the present technique, based on a detection result of the positional relationship between the optical system and the eye of the observer, a positional gap between the optical system and the eye of the observer is corrected. Thus, it becomes possible to correct the positional gap between the optical system and the eye of the observer appropriately.

Note that in the present technique, for example, an inclination estimating unit to estimate an inclination of the optical system may be further included and the positional relationship detecting unit may detect a positional relationship between the optical system and the eye of the observer based on the estimated eyeball position and the estimated inclination. In this case, even in a case where the optical system is inclined, it becomes possible to detect a positional relationship between the optical system and the eye of the observer accurately and to correct a positional gap between the optical system and the eye of the observer appropriately.

Effects of the Invention

According to the present technique, a positional gap between an optical system and an eye of an observer can be corrected appropriately.

BRIEF DESCRIPTION OF DRAWINGS

FIG. 13(a) to FIG. 13(c) are views illustrating an attachment example of an infrared sensor.

MODE FOR CARRYING OUT THE INVENTION

In the following, a mode for carrying out the invention (hereinafter, referred to as "embodiment") will be described. Note that the description will be made in the following order.
1. First Embodiment
2. Second Embodiment
3. Third Embodiment
4. Fourth Embodiment
5. Fifth Embodiment
6. Sixth Embodiment
7. Seventh Embodiment
8. Eighth Embodiment
9. Modification <1. First Embodiment>

[Configuration Example of Head-Mounted Display (Binocular)]

Figure 1:
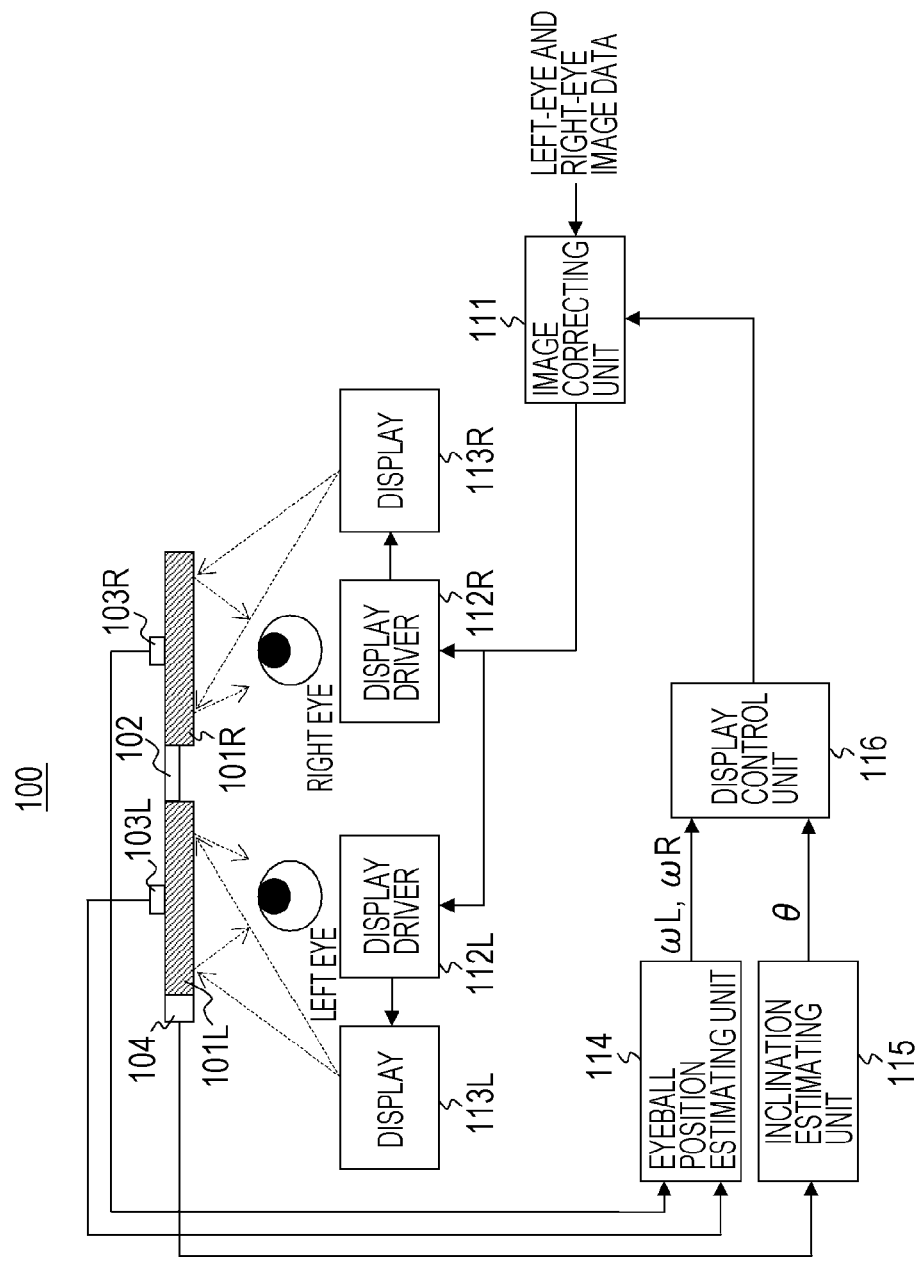
FIG. 1 is a view illustrating a schematic configuration example of an optical transmission head-mounted display (binocular) as a first embodiment.

FIG. 1 is a view illustrating a schematic configuration example of an optical transmission head-mounted display (HMD) 100 as the first embodiment. This configuration example is a binocular HMD. The HMD 100 includes a left-side spectacle lens unit 101L and a right-side spectacle lens unit 101R. The spectacle lens unit 101L and the spectacle lens unit 101R are connected integrally by a connection member 102.

In each of the spectacle lens units 101L and 101R, a spectacle lens and a piece of holographic optical element (HOE) sheet are integrated with each other. The HOE sheet includes a function such as that of a half mirror to synthesize external light and display light and also includes a function of a recessed surface or a free-form surface to magnify a display image.

To the spectacle lens units 101L and 101R, infrared sensors 103L and 103R are respectively attached. In this case, the infrared sensor 103L is attached to a center position in a horizontal direction of the spectacle lens unit 101L (center position in horizontal direction of left-eye optical system). Also, the infrared sensor 103R is attached to a center position in a horizontal direction of the spectacle lens unit 101R (center position in horizontal direction of right-eye optical system). Also, to the spectacle lens unit 101L, a gyro sensor 104 to detect an inclination of an optical system including the spectacle lens units 101L and 101R is attached.

A sensor output from each of the infrared sensors 103L and 103R is used for estimation of an eyeball position by a sclera reflection method. The sclera reflection method is a method using a difference between reflectivity of a cornea (black part of eye) and that of a sclera (white part of eye). In this case, an infrared sensor performs scanning in a horizontal direction with a weak infrared ray emitted to a side of an eye of an observer and detects reflection light thereof. Since there is a large difference between intensity of reflection light from the cornea (black part of eye) and that from the sclera (white part of eye), an eyeball position of the observer can be estimated from the sensor outputs.

Also, the HMD 100 includes an image correcting unit 111, display drivers 112L and 112R, displays 113L and 113R, an eyeball position estimating unit 114, an inclination estimating unit 115, and a display control unit 116.

The display 113L is included in the display element and displays a left-eye image. The display 113L includes, for example, a liquid crystal display (LCD) and displays a left-eye image, which is included in a three-dimensional image, by being driven by the display driver 112L. Also, the display 113R is included in the display element and displays a right-eye image. The display 113R includes, for example, a liquid crystal display (LCD) and displays a right-eye image, which is included in the three-dimensional image, by being driven by the display driver 112R.

The eyeball position estimating unit 114 estimates eyeball positions of a left eye and a right eye of the observer based on the sensor outputs from the infrared sensors 103L and 103R. In this case, based on a level of the sensor output from the infrared sensor 103L, the eyeball position estimating unit 114 sets an angle ωL, of when scanning of the cornea (black part of eye) is performed, as an estimation result of an eyeball position of the left eye. Also, in this case, based on a level of the sensor output from the infrared sensor 103R, the eyeball position estimating unit 114 sets an angle ωR, of when the scanning of the cornea (black part of eye) is performed, as an estimation result of an eyeball position of the right eye.

Based on a sensor output from the gyro sensor 104, the inclination estimating unit 115 estimates an inclination θ in the horizontal direction of the optical system including the spectacle lens units 101L and 101R. Based on estimation results of eyeball positions of the left eye and the right eye and an estimation result of an inclination of the optical system, the display control unit 116 detects a positional relationship between the left-eye optical system and the left eye and a positional relationship between the right-eye optical system and the right eye.

That is, the display control unit 116 calculates a positional gap dL of the left-eye optical system relative to the left eye of the observer based on the angle ωL which is an estimation result of the eyeball position of the left eye and calculates a positional gap dR of the right-eye optical system relative to the right eye of the observer based on the angle ωR which is an estimation result of the eyeball position of the right eye. Then, the display control unit 116 calculates a distance between both eyes de based on the positional gaps dL and dR calculated in such a manner and an already-known distance between sensors ds of the infrared sensors 103L and 103R.

Figure 2:
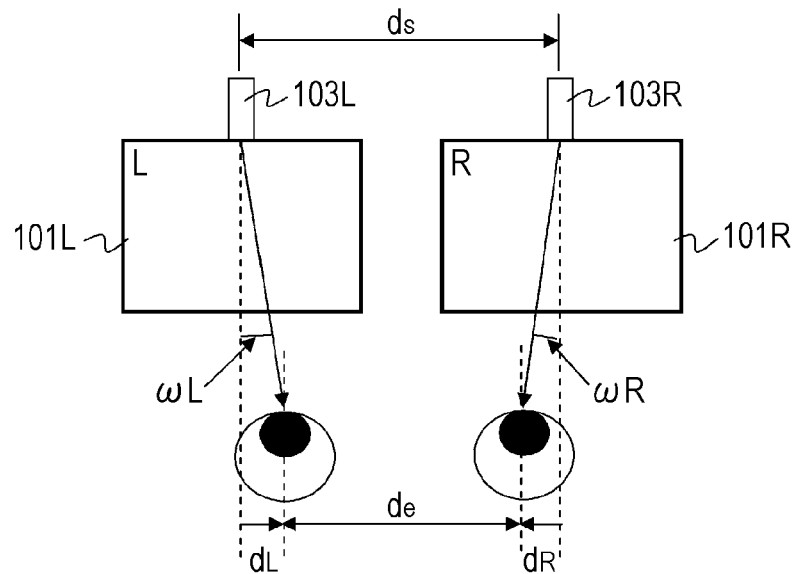
FIG. 2 is a view illustrating an example of a positional relationship between an optical system and an eyeball.

FIG. 2 is a view illustrating an example of the positional relationship between the optical system and the eyeball. In a case of this example, the distance between both eyes ds is expressed in the following equation (1).

$$de = ds - dL - dR \quad (1)$$

Note that in an example in FIG. 2, a case where the inclination θ of the optical system is zero is illustrated. However, there may be a case where the inclination θ of the optical system is not zero. In such a case, the display control unit 116 calculates the distance between both eyes de based on the positional gaps dL and dR calculated in such a manner, the already-known distance between sensors ds of the infrared sensors 103L and 103R, and the inclination θ.

Figure 3:
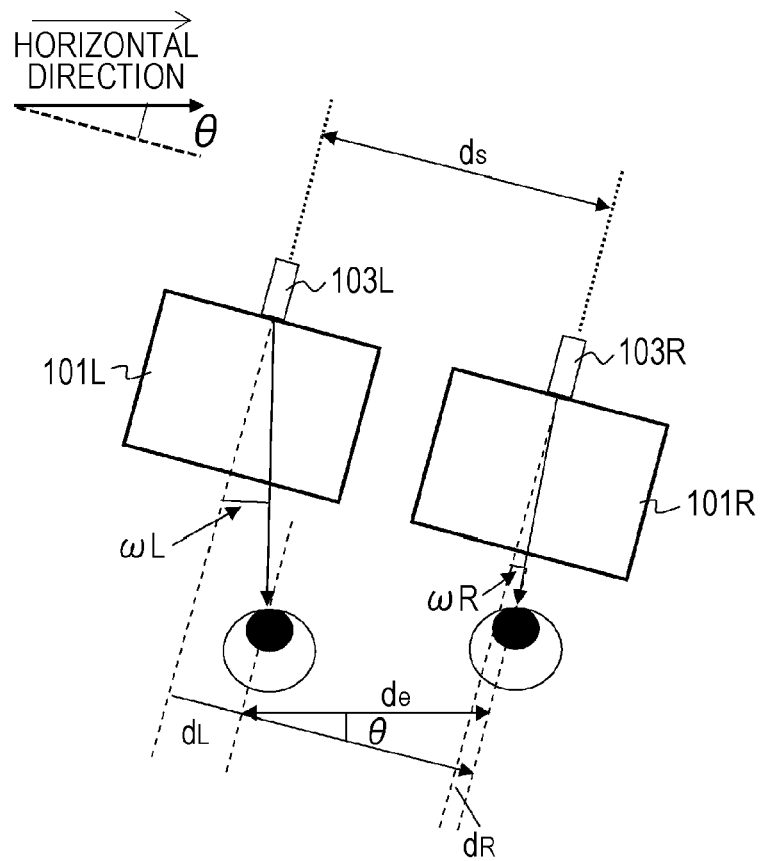
FIG. 3 is a view illustrating a different example of a positional relationship between the optical system and the eyeball.

FIG. 3 is a view illustrating an example of a positional relationship between the optical system and the eyeball in such a case. In a case of this example, the distance between both eyes de is expressed in the following equation (2). In such a manner, by taking the inclination θ into consideration, the distance between both eyes de can be acquired accurately.

$$de = ds/\cos\theta - dL/\cos\theta + dR/\cos\theta \quad (2)$$
$$= (ds - dL + dR)/\cos\theta$$

The display control unit 116 performs shift control of the display positions of the left-eye image and the right-eye image in directions opposite to each other in the horizontal direction based on the distance between both eyes de. That is, the display control unit 116 automatically corrects a positional gap between the optical system and the eyeball position of the observer by operating the images and moving the optical system electronically.

Figure 4:
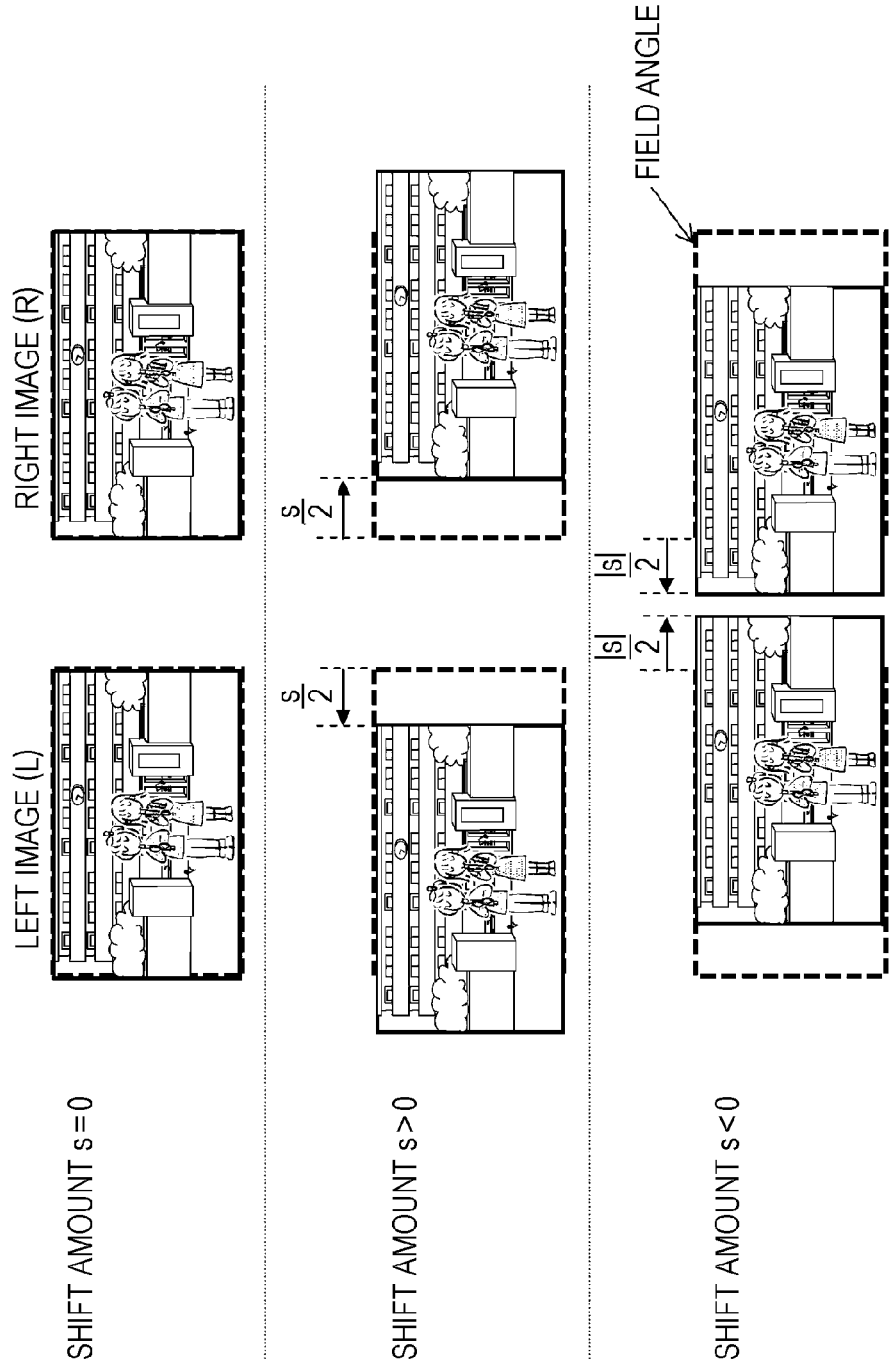
FIG. 4 is a view schematically illustrating shift control of a display position of each of a left-eye image and a right-eye image.

The display control unit 116 shifts the display positions of the left-eye image and the right-eye image according to a difference s (de−ds·cos θ) between the distance between both eyes de and the distance between sensors ds·cos θ in which the inclination θ is taken into consideration. FIG. 4 is a view schematically illustrating shift control of the display positions of the left-eye image and the right-eye image. In a case where S=0, as illustrated in FIG. 4(a), a shift amount in the horizontal direction of each of the left-eye image and the right-eye image is zero.

Also, in a case where S>0, as illustrated in FIG. 4(b), a shift amount in the horizontal direction of each of the left-eye image and the right-eye image is s/2 and the display positions thereof are made away from each other. Also, in a case where S<0, as illustrated in FIG. 4(c), a shift amount in the horizontal direction of each of the left-eye image and the right-eye image is |s|/2 and the display positions thereof are made closer to each other.

Referring back to FIG. 1, under control by the display control unit 116, the image correcting unit 111 performs, on left-eye image data and right-eye image data to display a three-dimensional (3D) image, image correction processing to shift a display position. The image correcting unit 111 supplies the corrected left-eye image data to the display driver 112L and supplies the corrected right-eye image data to the display driver 112R.

[Operation During Correction of Positional Gap]

An operation during correction of a positional gap between the optical system and the eye of the observer in the HMD 100 illustrated in FIG. 1 will be described. During the correction of a positional gap, for example, left-eye image data and right-eye image data for a test are used.

The left-eye image data is supplied to the display driver 112L through the image correcting unit 111. By the display driver 112L, the display 113L is driven and a left-eye image is displayed on the display 113L. Similarly, the right-eye image data is supplied to the display driver 112R through the image correcting unit 111. By the display driver 112R, the display 113R is driven and a right-eye image is displayed on the display 113R.

Light from the left-eye image displayed on the display 113L is reflected by the spectacle lens unit 101L and reaches the left eye of the observer. Accordingly, the left-eye image displayed on the display 113L is optically magnified by the spectacle lens unit 101L and is observed as a magnified virtual image by the left eye of the observer. Similarly, light from the right-eye image displayed on the display 113R is reflected by the spectacle lens unit 101R and reaches the right eye of the observer. Accordingly, the right-eye image displayed on the display 113R is optically magnified by the spectacle lens unit 101R and is observed as a magnified virtual image by the right eye of the observer. In such a manner, the left-eye image and the right-eye image are respectively observed by the left eye and the right eye of the observer, and thus, a magnified three-dimensional (3D) image can be perceived by the observer.

In such an image display state, a weak infrared ray is emitted to a side of the eye of the observer from the infrared sensor 103L attached to a center position in the horizontal direction of the spectacle lens unit 101L (center position in horizontal direction of left-eye optical system) and scanning in the horizontal direction is performed. Also, in such an image display state, a weak infrared ray is emitted to a side of the eye of the observer from the infrared sensor 103R attached to a center position in the horizontal direction of the spectacle lens unit 101R (center position in horizontal direction of right-eye optical system) and scanning in the horizontal direction is performed.

A sensor output from each of the infrared sensors 103L and 103R is supplied to the eyeball position estimating unit 114. In the eyeball position estimating unit 114, eyeball positions of the left eye and the right eye of the observer are estimated based on the sensor outputs from the infrared sensors 103L and 103R. From the eyeball position estimating unit 114, the angles ωL and ωR, of when the scanning of the cornea (black part of eye) is performed, are output respectively as estimation results of the eyeball positions of the left eye and the right eye (see FIG. 2 and FIG. 3).

Also, a sensor output from the gyro sensor 104 attached to the spectacle lens unit 101L is supplied to the inclination estimating unit 115. In the inclination estimating unit 115, an inclination θ in the horizontal direction of the optical system including the spectacle lens units 101L and 101R is estimated based on the sensor output from the gyro sensor 104 (see FIG. 3).

The angles ωL and ωR which are the estimation results by the eyeball position estimating unit 114 are supplied to the display control unit 116. Also, the inclination θ which is the estimation result by the inclination estimating unit 115 is supplied to the display control unit 116. In the display control unit 116, the positional gap dL of the left-eye optical system relative to the left eye of the observer and the positional gap dR of the right-eye optical system relative to the right eye of the observer are calculated based on the estimation results of the eyeball positions of the left eye and the right eye and the estimation result of the inclination of the optical system (see FIG. 2 and FIG. 3).

In the display control unit 116, the distance between both eyes de is calculated based on the positional gaps dL and dR, the already-known distance between sensors ds of the infrared sensors 103L and 103R, and the inclination θ (see equation (2)). In this case, since the inclination θ is taken into consideration, the distance between both eyes de is calculated with high accuracy.

Then, by the display control unit 116, the image correcting unit 111 is controlled and shift control of the display positions of the left-eye image and the right-eye image respectively displayed on the displays 113L and 113R is performed. In this case, according to a difference s (de−ds·cos θ) between the distance between both eyes de and the distance between sensors ds·cos θ in which the inclination θ is taken into consideration, control is performed in such a manner that the difference s becomes zero. Accordingly, a center in the horizontal direction of the left-eye image is made coincident with the left eye of the observer and a center in the horizontal direction of the right-eye image is made coincident with the right eye of the observer, whereby the positional gap between the optical system and the eye of the observer is corrected.

As described above, in the HMD 100 illustrated in FIG. 1, based on the detection result of the positional relationship between the optical system and the eye of the observer, shift control of the display positions of the left-eye image and the right-eye image is performed and the positional gap between the optical system and the eye of the observer is corrected electronically. Thus, correction of the positional gap between the optical system and the eye of the observer can be performed appropriately.

<2. Second Embodiment>

[Configuration Example of Head-Mounted Display (Binocular)]

Figure 5:
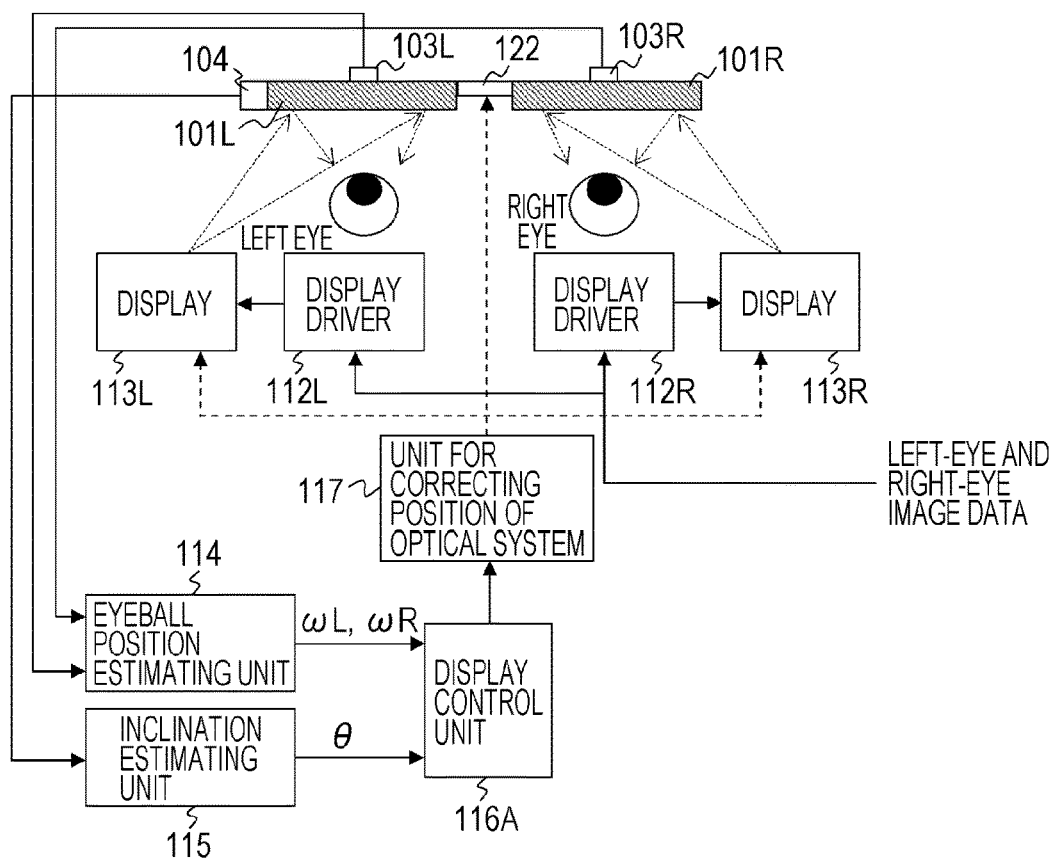
FIG. 5 is a view illustrating a schematic configuration example of an optical transmission head-mounted display (binocular) as a second embodiment.

FIG. 5 is a view illustrating a schematic configuration example of an optical transmission head-mounted display (HMD) 100A as the second embodiment. This configuration example is a binocular HMD. In FIG. 5, the same sign is assigned to a part corresponding to FIG. 1 and detail description of the part will be omitted arbitrarily.

The HMD 100A includes a left-side spectacle lens unit 101L and a right-side spectacle lens unit 101R. The spectacle lens unit 101L and the spectacle lens unit 101R are connected to each other by an optical system adjusting mechanism 122. The optical system adjusting mechanism 122 performs expansion and contraction of a distance between right and left optical systems, that is, a distance between the spectacle lens unit 101L which is included in a left-eye optical system and the spectacle lens unit 101R which is included in a right-eye optical system.

To the spectacle lens units 101L and 101R, infrared sensors 103L and 103R are respectively attached. Also, to the spectacle lens unit 101L, a gyro sensor 104 to detect an inclination of an optical system including the spectacle lens units 101L and 101R is attached. A sensor output from each of the infrared sensors 103L and 103R is used for estimation of an eyeball position by a sclera reflection method.

Also, the HMD 100A includes display drivers 112L and 112R, displays 113L and 113R, an eyeball position estimating unit 114, an inclination estimating unit 115, a display control unit 116A, and a unit for correcting a position of an optical system 117. The display 113L is driven by the display driver 112L and displays a left-eye image which is included in a three-dimensional image. Also, the display 113R is driven by the display driver 112R and displays a right-eye image which is included in the three-dimensional image.

Based on sensor outputs from the infrared sensors 103L and 103R, the eyeball position estimating unit 114 estimates eyeball positions of a left eye and a right eye of an observer and outputs angles ωL and ωR, of when scanning of a cornea (black part of eye) is performed, as estimation results of the eyeball positions (see FIG. 2 and FIG. 3). Based on a sensor output from the gyro sensor 104, the inclination estimating unit 115 outputs, as an estimation result, an inclination θ in a horizontal direction of the optical system including the spectacle lens units 101L and 101R (see FIG. 3).

The display control unit 116A calculates a positional gap dL of the left-eye optical system relative to the left eye of the observer based on the angle ωL and calculates a positional gap dR of the right-eye optical system relative to the right eye of the observer based on the angle ωR. The display control unit 116A calculates a distance between both eyes de based on the positional gaps dL and dR, an already-known distance between sensors ds of the infrared sensors 103L and 103R, and the inclination θ (see equation (2)).

Then, according to a difference s (de−ds·cos θ) between the distance between both eyes de and a distance between sensors ds·cos θ in which the inclination θ is taken into consideration, the display control unit 116A performs shift control of positions of the left-eye optical system and the right-eye optical system in directions opposite to each other in the horizontal direction. That is, the display control unit 116A automatically corrects a positional gap between the optical system and the eyeball position of the observer by mechanically moving the optical system. The shift control is similar to the above-described shift control of the display positions of the left-eye image and the right-eye image (see FIG. 4).

The unit for correcting a position of an optical system 117 corrects a position of the optical system under control by the display control unit 116A. That is, the unit for correcting a position of an optical system 117 adjusts expansion and contraction of the optical system adjusting mechanism 122 and adjusts a position in the horizontal direction of each of the spectacle lens unit 101L and the spectacle lens unit 101R. Also, along with this adjustment, the unit for correcting a position of an optical system 117 also adjusts positions of the displays 113L and 113R.

[Operation During Correction of Positional Gap]

An operation during correction of a positional gap between the optical system and the eye of the observer in the HMD 100A illustrated in FIG. 5 will be described. During the correction of a positional gap, for example, left-eye image data and right-eye image data for a test are used.

The left-eye image data is supplied to the display driver 112L. By the display driver 112L, the display 113L is driven and a left-eye image is displayed on the display 113L. Similarly, the right-eye image data is supplied to the display driver 112R. By the display driver 112R, the display 113R is driven and a right-eye image is displayed on the display 113R.

Light from the left-eye image displayed on the display 113L is reflected by the spectacle lens unit 101L and reaches the left eye of the observer. Accordingly, the left-eye image displayed on the display 113L is optically magnified by the spectacle lens unit 101L and is observed as a magnified virtual image by the left eye of the observer. Similarly, light from the right-eye image displayed on the display 113R is reflected by the spectacle lens unit 101R and reaches the right eye of the observer. Accordingly, the right-eye image displayed on the display 113R is optically magnified by the spectacle lens unit 101R and is observed as a magnified virtual image by the right eye of the observer. In such a manner, the left-eye image and the right-eye image are respectively observed by the left eye and the right eye of the observer, and thus, a magnified three-dimensional (3D) image can be perceived by the observer.

In such an image display state, a weak infrared ray is emitted to a side of the eye of the observer from the infrared sensor 103L attached to a center position in the horizontal direction of the spectacle lens unit 101L (center position in horizontal direction of left-eye optical system) and scanning in the horizontal direction is performed. Also, in such an image display state, a weak infrared ray is emitted to a side of the eye of the observer from the infrared sensor 103R attached to a center position in the horizontal direction of the spectacle lens unit 101R (center position in horizontal direction of right-eye optical system) and scanning in the horizontal direction is performed.

A sensor output from each of the infrared sensors 103L and 103R is supplied to the eyeball position estimating unit 114. In the eyeball position estimating unit 114, eyeball positions of the left eye and the right eye of the observer are estimated based on the sensor outputs from the infrared sensors 103L and 103R. From the eyeball position estimating unit 114, the angles ωL and ωR, of when the scanning of the cornea (black part of eye) is performed, are output respectively as estimation results of the eyeball positions of the left eye and the right eye (see FIG. 2 and FIG. 3).

Also, a sensor output from the gyro sensor 104 attached to the spectacle lens unit 101L is supplied to the inclination estimating unit 115. In the inclination estimating unit 115, an inclination θ in the horizontal direction of the optical system including the spectacle lens units 101L and 101R is estimated based on the sensor output from the gyro sensor 104 (see FIG. 3).

The angles ωL and ωR which are the estimation results by the eyeball position estimating unit 114 are supplied to the display control unit 116A. Also, the inclination θ which is the estimation result by the inclination estimating unit 115 is supplied to the display control unit 116A. In the display control unit 116A, the positional gap dL of the left-eye optical system relative to the left eye of the observer and the positional gap dR of the right-eye optical system relative to the right eye of the observer are calculated based on the estimation results of the eyeball positions of the left eye and the right eye and the estimation result of the inclination of the optical system (see FIG. 2 and FIG. 3).

In the display control unit 116A, the distance between both eyes de is calculated based on the positional gaps dL and dR, the already-known distance between sensors ds of the infrared sensors 103L and 103R, and the inclination θ (see equation (2)). In this case, since the inclination θ is taken into consideration, the distance between both eyes de is calculated with high accuracy.

Then, by the display control unit 116A, the unit for correcting a position of an optical system 117 is controlled and shift control of positions of the left-eye optical system and the right-eye optical system, that is, positions of the spectacle lens units 101L and 101R and positions of the displays 113L and 113R is performed. In this case, according to a difference s (de−ds·cos θ) between the distance between both eyes de and the distance between sensors ds·cos θ in which the inclination θ is taken into consideration, control is performed in such a manner that the difference s becomes zero. Accordingly, a center in the horizontal direction of the left-eye optical system is made coincident with the left eye of the observer and a center in the horizontal direction of the right-eye optical system is made coincident with the right eye of the observer, whereby the positional gap between the optical system and the eye of the observer is corrected.

As described above, in the HMD 100A illustrated in FIG. 5, based on a detection result of the positional relationship between the optical system and the eye of the observer, shift control of the positions of the left-eye optical system and the right-eye optical system is performed and the positional gap between the optical system and the eye of the observer is corrected mechanically. Thus, correction of the positional gap between the optical system and the eye of the observer can be performed appropriately.

<3. Third Embodiment>

[Configuration Example of Head-Mounted Display (Binocular)]

Figure 6:
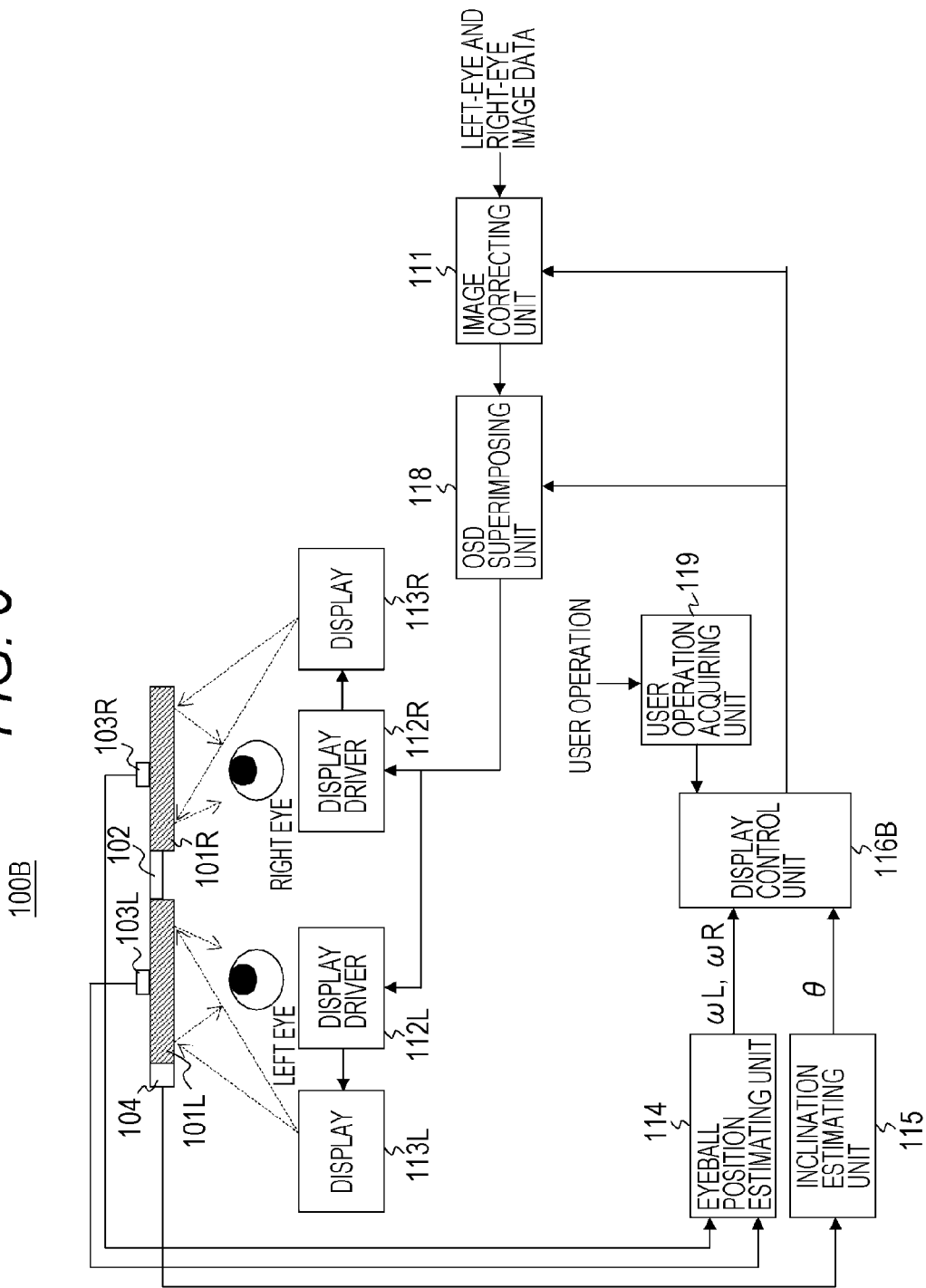
FIG. 6 is a view illustrating a schematic configuration example of an optical transmission head-mounted display (binocular) as a third embodiment.

FIG. 6 is a view illustrating a schematic configuration example of an optical transmission head-mounted display (HMD) 100B as the third embodiment. This configuration example is a binocular HMD. In FIG. 6, the same sign is assigned to a part corresponding to FIG. 1 and detail description of the part will be omitted arbitrarily. The HMD 100B includes a left-side spectacle lens unit 101L and a right-side spectacle lens unit 101R. The spectacle lens unit 101L and the spectacle lens unit 101R are connected integrally by a connection member 102.

To the spectacle lens units 101L and 101R, infrared sensors 103L and 103R are respectively attached. Also, to the spectacle lens unit 101L, a gyro sensor 104 to detect an inclination of an optical system including the spectacle lens units 101L and 101R is attached. A sensor output from each of the infrared sensors 103L and 103R is used for estimation of an eyeball position by a sclera reflection method.

Also, the HMD 100B includes display drivers 112L and 112R, displays 113L and 113R, an eyeball position estimating unit 114, an inclination estimating unit 115, a display control unit 116B, an image correcting unit 111, and an OSD superimposing unit 118. The display 113L is driven by the display driver 112L and displays a left-eye image which is included in a three-dimensional image. Also, the display 113R is driven by the display driver 112R and displays a right-eye image which is included in the three-dimensional image.

Based on sensor outputs from the infrared sensors 103L and 103R, the eyeball position estimating unit 114 estimates eyeball positions of a left eye and a right eye of an observer and outputs angles ωL and ωR, of when scanning of a cornea (black part of eye) is performed, as estimation results of the eyeball positions (see FIG. 2 and FIG. 3). Based on a sensor output from the gyro sensor 104, the inclination estimating unit 115 outputs, as an estimation result, an inclination θ in a horizontal direction of the optical system including the spectacle lens units 101L and 101R (see FIG. 3).

The display control unit 116B calculates a positional gap dL of the left-eye optical system relative to the left eye of the observer based on the angle ωL and calculates a positional gap dR of the right-eye optical system relative to the right eye of the observer based on the angle ωR. The display control unit 116B calculates a distance between both eyes de based on the positional gaps dL and dR, an already-known distance between sensors ds of the infrared sensors 103L and 103R, and the inclination θ (see equation (2)).

Figure 7:
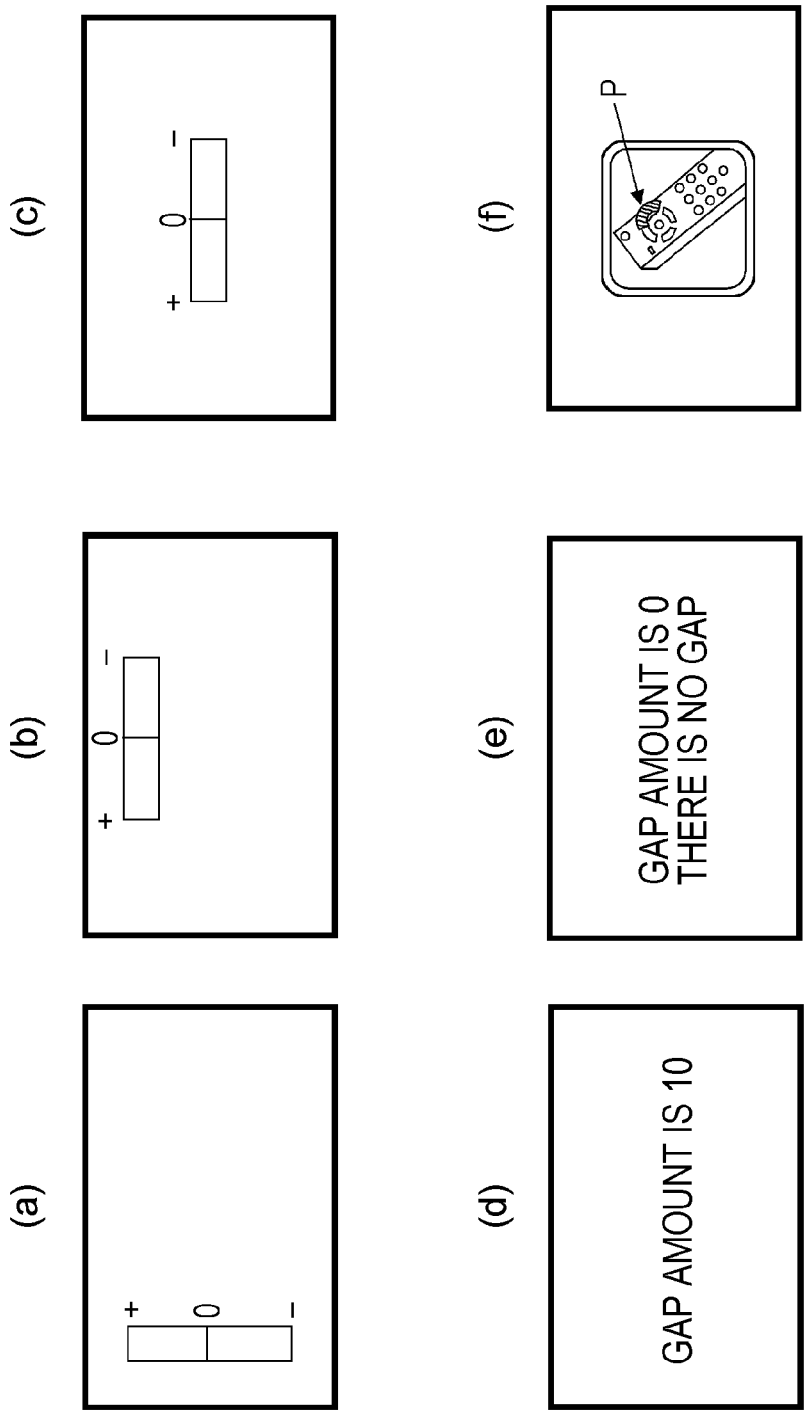
FIG. 7(a) to FIG. 7(f) are views illustrating an example of an OSD display.

Then, according to a difference s (de−ds·cos θ) between the distance between both eyes de and a distance between sensors ds·cos θ in which the inclination θ is taken into consideration, the display control unit 116B performs OSD display of the difference s or OSD display to prompt a user to perform operation of correcting the difference s. FIG. 7(a) to FIG. 7(f) are views illustrating an example of OSD display. FIG. 7(a) is an example of displaying a gauge indicating the difference s (amount of positional gap) and the gauge is displayed on a left end side of a screen.

FIG. 7(b) is also an example of displaying a gauge indicating the difference s (amount of positional gap) and the gauge is displayed on an upper end side of the screen. FIG. 7(c) is also an example of displaying a gauge indicating the difference s (amount of positional gap) and the gauge is displayed at a center of the screen. By displaying the gauge at the center of the screen, an observer focuses on the gauge itself and deviation of a line of sight can be prevented. FIG. 7(d) and FIG. 7(e) are examples of displaying a character indicating the difference s (amount of positional gap). Also, FIG. 7(f) is a view illustrating an example of the OSD display to prompt a user to perform operation of correcting the difference s. As indicated by an arrow P, an operation button (place to be operated) of a remote-control apparatus to be operated by the user is illustrated. Note that it is also considered that the display of the gauge, the display of the character, the display of the operation button of the remote-control apparatus may be arbitrarily combined and displayed.

Also, based on user operation acquired in a user operation acquiring unit 119, the display control unit 116B shifts display positions of the left-eye image and the right-eye image. Note that in this case, as described above, a user performs correction operation in such a manner that the difference s becomes zero based on the OSD display of the difference s or the OSD display to prompt the user to perform operation of correcting the difference s.

Under control by the display control unit 116B, the image correcting unit 111 performs, on left-eye image data and right-eye image data to display a three-dimensional (3D) image, image correction processing to shift a display position. Through the OSD superimposing unit 118, the image correcting unit 111 supplies the corrected left-eye image data to the display driver 112L and supplies the corrected right-eye image data to the display driver 112R. The OSD superimposing unit 118 superimposes a display signal for the OSD display, which signal is output from the display control unit 116B, on the left-eye image data and the right-eye image data.

[Operation During Correction of Positional Gap]

An operation during correction of a positional gap between the optical system and the eye of the observer in the HMD 100B illustrated in FIG. 6 will be described. During the correction of a positional gap, for example, left-eye image data and right-eye image data for a test are used.

The left-eye image data is supplied to the display driver 112L through the image correcting unit 111. By the display driver 112L, the display 113L is driven and a left-eye image is displayed on the display 113L. Similarly, the right-eye image data is supplied to the display driver 112R through the image correcting unit 111. By the display driver 112R, the display 113R is driven and a right-eye image is displayed on the display 113R.

Light from the left-eye image displayed on the display 113L is reflected by the spectacle lens unit 101L and reaches the left eye of the observer. Accordingly, the left-eye image displayed on the display 113L is optically magnified by the spectacle lens unit 101L and is observed as a magnified virtual image by the left eye of the observer. Similarly, light from the right-eye image displayed on the display 113R is reflected by the spectacle lens unit 101R and reaches the right eye of the observer. Accordingly, the right-eye image displayed on the display 113R is optically magnified by the spectacle lens unit 101R and is observed as a magnified virtual image by the right eye of the observer. In such a manner, the left-eye image and the right-eye image are respectively observed by the left eye and the right eye of the observer, and thus, a magnified three-dimensional (3D) image can be perceived by the observer.

In such an image display state, a weak infrared ray is emitted to a side of the eye of the observer from the infrared sensor 103L attached to a center position in the horizontal direction of the spectacle lens unit 101L (center position in horizontal direction of left-eye optical system) and scanning in the horizontal direction is performed. Also, in such an image display state, a weak infrared ray is emitted to a side of the eye of the observer from the infrared sensor 103R attached to a center position in the horizontal direction of the spectacle lens unit 101R (center position in horizontal direction of right-eye optical system) and scanning in the horizontal direction is performed.

A sensor output from each of the infrared sensors 103L and 103R is supplied to the eyeball position estimating unit 114. In the eyeball position estimating unit 114, eyeball positions of the left eye and the right eye of the observer are estimated based on the sensor outputs from the infrared sensors 103L and 103R. From the eyeball position estimating unit 114, the angles ωL and ωR, of when the scanning of the cornea (black part of eye) is performed, are output respectively as estimation results of the eyeball positions of the left eye and the right eye (see FIG. 2 and FIG. 3).

Also, a sensor output from the gyro sensor 104 attached to the spectacle lens unit 101L is supplied to the inclination estimating unit 115. In the inclination estimating unit 115, an inclination θ in the horizontal direction of the optical system including the spectacle lens units 101L and 101R is estimated based on the sensor output from the gyro sensor 104 (see FIG. 3).

The angles ωL and ωR which are the estimation results by the eyeball position estimating unit 114 are supplied to the display control unit 116B. Also, the inclination θ which is the estimation result by the inclination estimating unit 115 is supplied to the display control unit 116B. In the display control unit 116B, the positional gap dL of the left-eye optical system relative to the left eye of the observer and the positional gap dR of the right-eye optical system relative to the right eye of the observer are calculated based on the estimation results of the eyeball positions of the left eye and the right eye and the estimation result of the inclination of the optical system (see FIG. 2 and FIG. 3).

In the display control unit 116B, the distance between both eyes de is calculated based on the positional gaps dL and dR, the already-known distance between sensors ds of the infrared sensors 103L and 103R, and the inclination θ (see equation (2)). In this case, since the inclination θ is taken into consideration, the distance between both eyes de is calculated with high accuracy.

Then, in the display control unit 116B, the difference s (de−ds·cos θ) between the distance between both eyes de and the distance between sensors ds·cos θ in which the inclination e is taken into consideration is calculated. From the display control unit 116B, a display signal for the OSD display of the difference s or for the OSD display to prompt a user to perform operation of correcting the difference s is output. The display signal is supplied to the OSD superimposing unit 118 and is superimposed on the left-eye image data and the right-eye image data. Accordingly, the OSD display is performed on the displays 113L and 113R.

By the observer, correction operation to make the difference s into zero is performed based on the OSD display. The user operation acquiring unit 119 acquires the user operation and transmits the acquired user operation to the display control unit 116B. Based on the correction operation, by the display control unit 116B, the image correcting unit 111 is controlled and shift control of the display positions of the left-eye image and the right-eye image respectively displayed on the displays 113L and 113R is performed. Accordingly, a center in the horizontal direction of the left-eye image is made coincident with the left eye of the observer and a center in the horizontal direction of the right-eye image is made coincident with the right eye of the observer, whereby the positional gap between the optical system and the eye of the observer is corrected.

As described above, in the HMD 100B illustrated in FIG. 6, based on a detection result of the positional relationship between the optical system and the eye of the observer, OSD display of the positional gap between the optical system and the eye of the observer is performed. Based on the OSD display, correction operation is performed by the observer to eliminate the positional gap. Then, according to the correction operation, shift control of the display positions of the left-eye image and the right-eye image is performed and the positional gap between the optical system and the eye of the observer is electronically corrected. Thus, correction of the positional gap between the optical system and the eye of the observer can be performed appropriately.

<4. Fourth Embodiment>
[Configuration Example of Head-Mounted Display (Binocular)]

Figure 8:
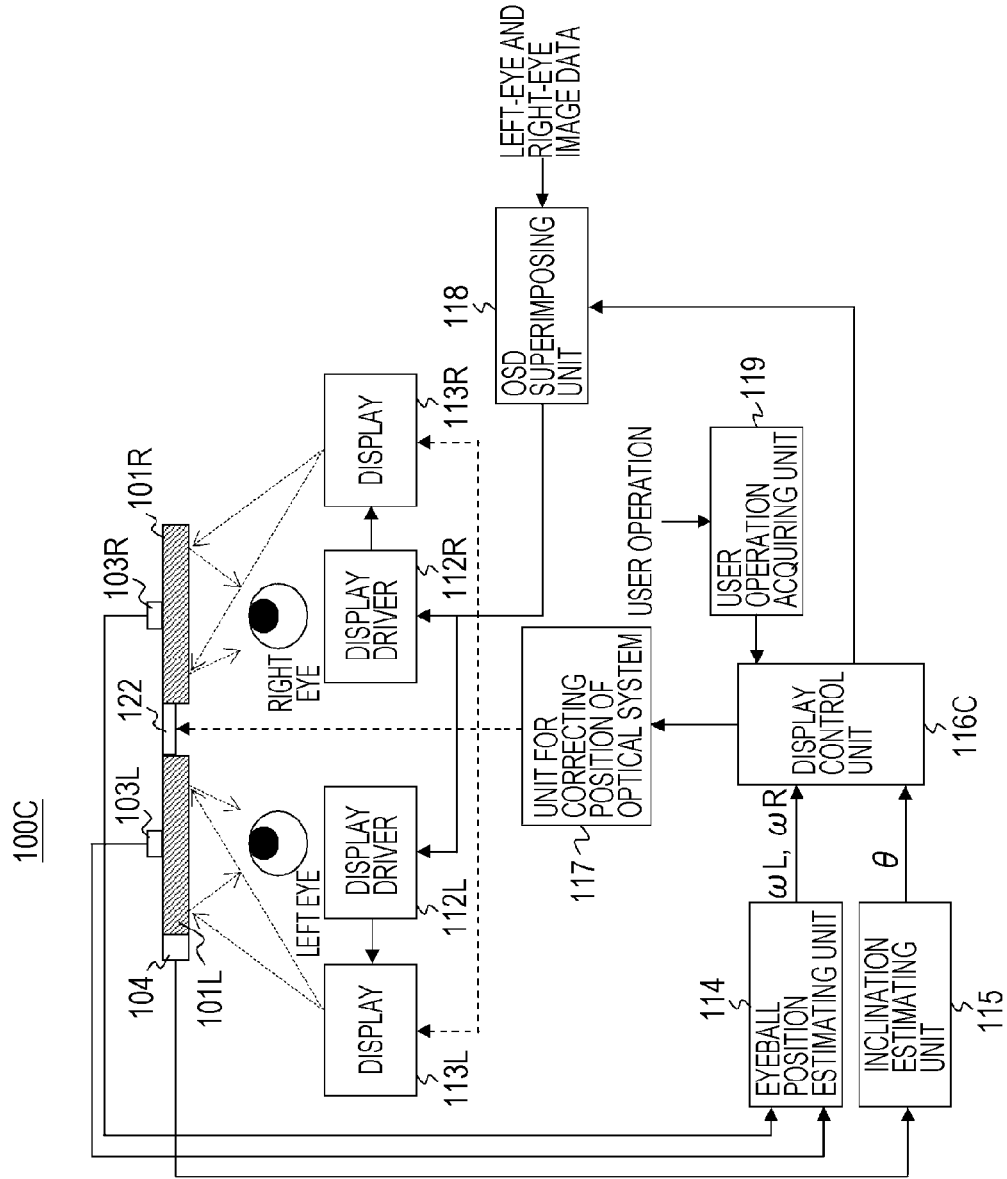
FIG. 8 is a view illustrating a schematic configuration example of an optical transmission head-mounted display (binocular) as a fourth embodiment.

FIG. 8 is a view illustrating a schematic configuration example of an optical transmission head-mounted display (HMD) 100C as the fourth embodiment. This configuration example is a binocular HMD. In FIG. 8, the same sign is assigned to a part corresponding to FIG. 2 or FIG. 6 and detail description of the part will be omitted arbitrarily. The HMD 100C includes a left-side spectacle lens unit 101L and a right-side spectacle lens unit 101R. The spectacle lens unit 101L and the spectacle lens unit 101R are connected to each other by an optical system adjusting mechanism 122.

To the spectacle lens units 101L and 101R, infrared sensors 103L and 103R are respectively attached. Also, to the spectacle lens unit 101L, a gyro sensor 104 to detect an inclination of an optical system including the spectacle lens units 101L and 101R is attached. A sensor output from each of the infrared sensors 103L and 103R is used for estimation of an eyeball position by a sclera reflection method.

Also, the HMD 100C includes display drivers 112L and 112R, displays 113L and 113R, an eyeball position estimating unit 114, an inclination estimating unit 115, a display control unit 116C, a unit for correcting a position of an optical system 117, an OSD superimposing unit 118, and a user operation acquiring unit 119. The display 113L is driven by the display driver 112L and displays a left-eye image which is included in a three-dimensional image. Also, the display 113R is driven by the display driver 112R and displays a right-eye image which is included in the three-dimensional image.

Based on sensor outputs from the infrared sensors 103L and 103R, the eyeball position estimating unit 114 estimates eyeball positions of a left eye and a right eye of an observer and outputs angles ωL and ωR, of when scanning of a cornea (black part of eye) is performed, as estimation results of the eyeball positions (see FIG. 2 and FIG. 3). Based on a sensor output from the gyro sensor 104, the inclination estimating unit 115 outputs, as an estimation result, an inclination θ in a horizontal direction of the optical system including the spectacle lens units 101L and 101R (see FIG. 3).

The display control unit 116C calculates a positional gap dL of the left-eye optical system relative to the left eye of the observer based on the angle ωL and calculates a positional gap dR of the right-eye optical system relative to the right eye of the observer based on the angle ωR. The display control unit 116C calculates a distance between both eyes de based on the positional gaps dL and dR, an already-known distance between sensors ds of the infrared sensors 103L and 103R, and the inclination θ (see equation (2)).

According to a difference s (de−ds·cos θ) between the distance between both eyes de and the distance between sensors ds·cos θ in which the inclination θ is taken into consideration, the display control unit 116C performs OSD display of the difference s or OSD display to prompt a user to perform operation of correcting the difference s.

Also, the display control unit 116C shifts positions of the left-eye optical system and the right-eye optical system based on user operation acquired in the user operation acquiring unit 119. Note that in this case, as described above, a user performs correction operation in such a manner that the difference s becomes zero based on the OSD display of the difference s or the OSD display to prompt the user to perform operation of correcting the difference s.

The unit for correcting a position of an optical system 117 corrects a position of the optical system under control by the display control unit 116C. That is, the unit for correcting a position of an optical system 117 adjusts expansion and contraction of the optical system adjusting mechanism 122 and adjusts a position in the horizontal direction of each of the spectacle lens unit 101L and the spectacle lens unit 101R. Also, along with this adjustment, the unit for correcting a position of an optical system 117 also adjusts positions of the displays 113L and 113R. The OSD superimposing unit 118 superimposes a display signal for the OSD display, which signal is output from the display control unit 116C, on the left-eye image data and the right-eye image data.

[Operation During Correction of Positional Gap]

An operation during correction of a positional gap between the optical system and the eye of the observer in the HMD 100C illustrated in FIG. 8 will be described. During the correction of a positional gap, for example, left-eye image data and right-eye image data for a test are used.

The left-eye image data is supplied to the display driver 112L. By the display driver 112L, the display 113L is driven and a left-eye image is displayed on the display 113L. Similarly, the right-eye image data is supplied to the display driver 112R. By the display driver 112R, the display 113R is driven and a right-eye image is displayed on the display 113R.

Light from the left-eye image displayed on the display 113L is reflected by the spectacle lens unit 101L and reaches the left eye of the observer. Accordingly, the left-eye image displayed on the display 113L is optically magnified by the spectacle lens unit 101L and is observed as a magnified virtual image by the left eye of the observer. Similarly, light from the right-eye image displayed on the display 113R is reflected by the spectacle lens unit 101R and reaches the right eye of the observer. Accordingly, the right-eye image displayed on the display 113R is optically magnified by the spectacle lens unit 101R and is observed as a magnified virtual image by the right eye of the observer. In such a manner, the left-eye image and the right-eye image are respectively observed by the left eye and the right eye of the observer, and thus, a magnified three-dimensional (3D) image can be perceived by the observer.

In such an image display state, a weak infrared ray is emitted to a side of the eye of the observer from the infrared sensor 103L attached to a center position in the horizontal direction of the spectacle lens unit 101L (center position in horizontal direction of left-eye optical system) and scanning in the horizontal direction is performed. Also, in such an image display state, a weak infrared ray is emitted to a side of the eye of the observer from the infrared sensor 103R attached to a center position in the horizontal direction of the spectacle lens unit 101R (center position in horizontal direction of right-eye optical system) and scanning in the horizontal direction is performed.

A sensor output from each of the infrared sensors 103L and 103R is supplied to the eyeball position estimating unit 114. In the eyeball position estimating unit 114, eyeball positions of the left eye and the right eye of the observer are estimated based on the sensor outputs from the infrared sensors 103L and 103R. From the eyeball position estimating unit 114, the angles $\omega L$ and $\omega R$, of when the scanning of the cornea (black part of eye) is performed, are output respectively as estimation results of the eyeball positions of the left eye and the right eye (see FIG. 2 and FIG. 3).

Also, a sensor output from the gyro sensor 104 attached to the spectacle lens unit 101L is supplied to the inclination estimating unit 115. In the inclination estimating unit 115, an inclination $\theta$ in the horizontal direction of the optical system including the spectacle lens units 101L and 101R is estimated based on the sensor output from the gyro sensor 104 (see FIG. 3).

The angles $\omega L$ and $\omega R$ which are the estimation results by the eyeball position estimating unit 114 are supplied to the display control unit 116C. Also, the inclination $\theta$ which is the estimation result by the inclination estimating unit 115 is supplied to the display control unit 116C. In the display control unit 116C, the positional gap dL of the left-eye optical system relative to the left eye of the observer and the positional gap dR of the right-eye optical system relative to the right eye of the observer are calculated based on the estimation results of the eyeball positions of the left eye and the right eye and the estimation result of the inclination of the optical system (see FIG. 2 and FIG. 3).

In the display control unit 116C, the distance between both eyes de is calculated based on the positional gaps dL and dR, the already-known distance between sensors ds of the infrared sensors 103L and 103R, and the inclination $\theta$ (see equation (2)). In this case, since the inclination $\theta$ is taken into consideration, the distance between both eyes de is calculated with high accuracy.

Then, in the display control unit 116C, the difference s (de−ds·cos $\theta$) between the distance between both eyes de and the distance between sensors ds·cos $\theta$ in which the inclination e is taken into consideration is calculated. From the display control unit 116C, a display signal for the OSD display of the difference s or for the OSD display to prompt a user to perform operation of correcting the difference s is output. The display signal is supplied to the OSD superimposing unit 118 and is superimposed on the left-eye image data and the right-eye image data. Accordingly, the OSD display is performed on the displays 113L and 113R.

By the observer, correction operation to make the difference s into zero is performed based on the OSD display. The user operation acquiring unit 119 acquires the user operation and transmits the acquired user operation to the display control unit 116C. Based on the correction operation, by the display control unit 116C, the unit for correcting a position of an optical system 117 is controlled and shift control of positions of the left-eye optical system and the right-eye optical system, that is, positions of the spectacle lens units 101L and 101R and positions of the displays 101L and 101R is performed. Accordingly, a center in the horizontal direction of the left-eye optical system is made coincident with the left eye of the observer and a center in the horizontal direction of the right-eye optical system is made coincident with the right eye of the observer, whereby the positional gap between the optical system and the eye of the observer is corrected.

As described above, in the HMD 100C illustrated in FIG. 8, based on a detection result of the positional relationship between the optical system and the eye of the observer, OSD display of the positional gap between the optical system and the eye of the observer is performed. Based on the OSD display, correction operation is performed by the observer to eliminate the positional gap. Then, according to the correction operation, shift control of the left-eye optical system and the right-eye optical system is performed and the positional gap between the optical system and the eye of the observer is mechanically corrected. Thus, correction of the positional gap between the optical system and the eye of the observer can be performed appropriately.

<5. Fifth Embodiment>

[Configuration Example of Head-Mounted Display (Monocular)]

Figure 9:
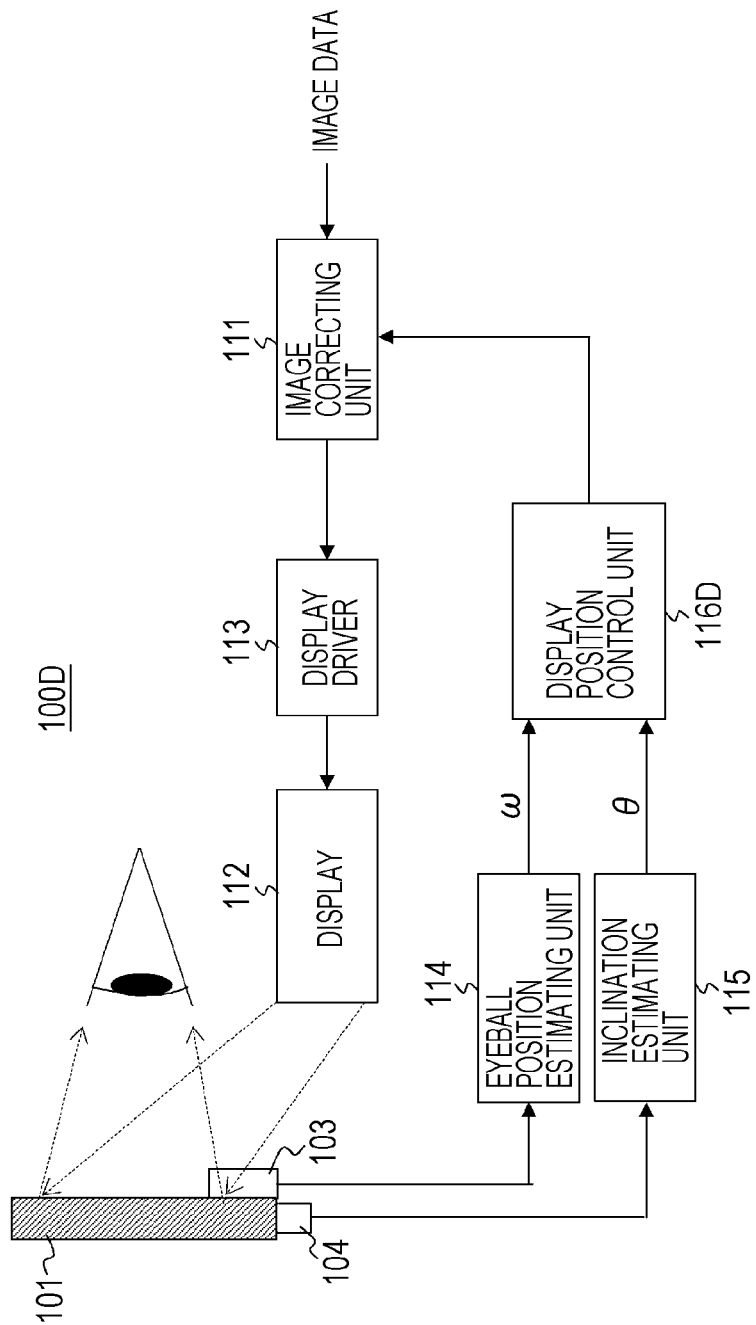
FIG. 9 is a view illustrating a schematic configuration example of an optical transmission head-mounted display (monocular) as a fifth embodiment.

FIG. 9 is a view illustrating a schematic configuration example of an optical transmission head-mounted display (HMD) 100D as the fifth embodiment. This configuration example is a monocular HMD. In FIG. 9, the same sign is assigned to a part corresponding to FIG. 1 and detail description of the part will be omitted arbitrarily.

Since the HMD 100D is a monocular HMD, the HMD 100D includes one spectacle lens unit 101 while the HMD 100 illustrated in FIG. 1 includes the two spectacle lens units 101L and 101R. To the spectacle lens unit 101, an infrared sensor 103 is attached. The infrared sensor 103 functions similarly to the infrared sensors 103L and 103R in the HMD 100 illustrated in FIG. 1 and transmits a sensor output therefrom to an eyeball position estimating unit 114. Also, to the spectacle lens unit 101, a gyro sensor 104 to detect an inclination of an optical system including the spectacle lens unit 101 is attached. The gyro sensor 104 transmits a sensor output therefrom to an inclination estimating unit 105.

Also, since the HMD 100D is a monocular HMD, the HMD 100D includes a display driver 112 and a display 113 of one system. The display 113 is driven by the display driver 112 and displays an image. Light from the image displayed on the display 113 is reflected by the spectacle lens unit 101 and reaches an eye of an observer (left eye or right eye). Accordingly, the image displayed on the display 113 is optically magnified by the spectacle lens unit 101 and is observed as a magnified virtual image by the eye of the observer.

Similarly to the eyeball position estimating unit 114 in the HMD 100 in FIG. 1, based on the sensor output from the infrared sensor 103, the eyeball position estimating unit 114 estimates an eyeball position of the eye of the observer and outputs an angle ω, of when scanning of a cornea (black part of eye) is performed, as an estimation result of the eyeball position (see FIG. 2 and FIG. 3). Also, similarly to the inclination estimating unit 115 in the HMD 100 in FIG. 1, based on the sensor output from the gyro sensor 104, the inclination estimating unit 115 estimates an inclination θ in a horizontal direction of the optical system including the spectacle lens unit 101 (see FIG. 3).

The display control unit 116D calculates a positional gap d of the optical system relative to the eye of the observer based on the estimation result of the eyeball position and the estimation result of the inclination of the optical system. With reference to FIG. 3, the positional gap d corresponds to dL/cos θ or dR/cos θ. Based on the positional gap d, the display control unit 116D controls an image correcting unit 111 in such a manner that a value of the positional gap d becomes zero and performs shift control, in the horizontal direction, of a display position of the image displayed on the display 113. Accordingly, a center in the horizontal direction of the image is made coincident with the eye of the observer and the positional gap between the optical system and the eye of the observer is corrected.

Detail description of the other parts of the HMD 100D illustrated in FIG. 9 is omitted. However, the other parts are configured and operate similarly to those of the HMD 100 illustrated in FIG. 1. As described above, in the HMD 100D illustrated in FIG. 9, based on a detection result of the positional relationship between the optical system and the eye of the observer, shift control of the display position of the image is performed and the positional gap between the optical system and the eye of the observer is corrected electronically. Thus, correction of the positional gap between the optical system and the eye of the observer can be performed appropriately.

<6. Sixth Embodiment>
[Configuration Example of Head-Mounted Display (Monocular)]

Figure 10:
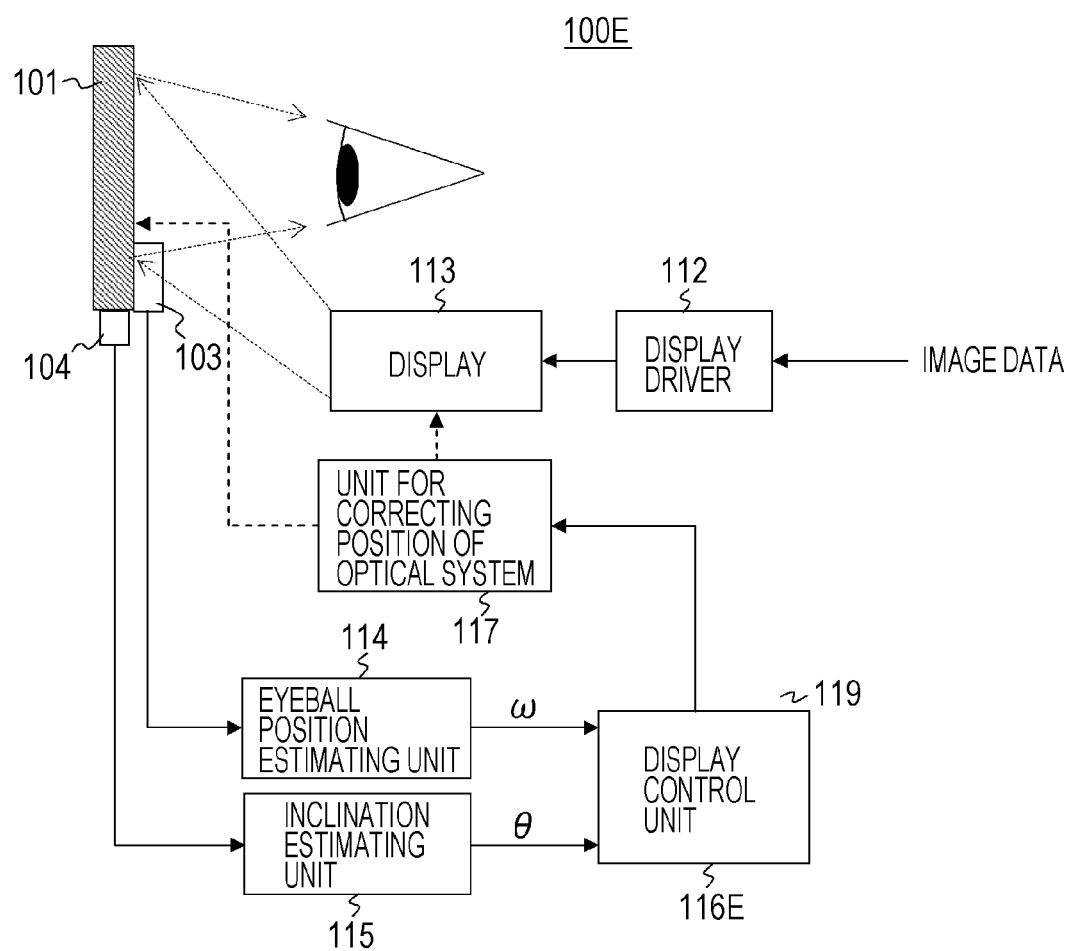
FIG. 10 is a view illustrating a schematic configuration example of an optical transmission head-mounted display (monocular) as a sixth embodiment.

FIG. 10 is a view illustrating a schematic configuration example of an optical transmission head-mounted display (HMD) 100E as the sixth embodiment. This configuration example is a monocular HMD. In FIG. 10, the same sign is assigned to a part corresponding to FIG. 5 or FIG. 9 and detail description of the part will be omitted arbitrarily.

Since the HMD 100E is a monocular HMD, the HMD 100E includes one spectacle lens unit 101 while the HMD 100A illustrated in FIG. 5 includes two spectacle lens units 101L and 101R. To the spectacle lens unit 101, an infrared sensor 103 is attached. The infrared sensor 103 functions similarly to the infrared sensors 103L and 103R in the HMD 100A illustrated in FIG. 5 and transmits a sensor output therefrom to an eyeball position estimating unit 114. Also, to the spectacle lens unit 101, a gyro sensor 104 to detect an inclination of an optical system including the spectacle lens unit 101 is attached. The gyro sensor 104 transmits a sensor output therefrom to an inclination estimating unit 105.

Also, since the HMD 100E is a monocular HMD, the HMD 100E includes a display driver 112 and a display 113 of one system. The display 113 is driven by the display driver 112 and displays an image. Light from the image displayed on the display 113 is reflected by the spectacle lens unit 101 and reaches an eye of an observer (left eye or right eye). Accordingly, the image displayed on the display 113 is optically magnified by the spectacle lens unit 101 and is observed as a magnified virtual image by the eye of the observer.

Similarly to the eyeball position estimating unit 114 in the HMD 100A in FIG. 5, based on the sensor output from the infrared sensor 103, the eyeball position estimating unit 114 estimates an eyeball position of the eye of the observer and outputs an angle ω, of when scanning of a cornea (black part of eye) is performed, as an estimation result of the eyeball position (see FIG. 2 and FIG. 3). Also, similarly to the inclination estimating unit 115 in the HMD 100A in FIG. 5, based on the sensor output from the gyro sensor 104, the inclination estimating unit 115 estimates an inclination θ in a horizontal direction of the optical system including the spectacle lens unit 101 (see FIG. 3).

The display control unit 116E calculates a positional gap d of the optical system relative to the eye of the observer based on the estimation result of the eyeball position and the estimation result of the inclination of the optical system. With reference to FIG. 3, the positional gap d corresponds to dL/cos θ or dR/cos θ. Based on the positional gap d, the display control unit 116E controls a unit for correcting a position of an optical system 117 in such a manner that a value of the positional gap d becomes zero and performs shift control, in the horizontal direction, of a position of the spectacle lens unit 101, that is, of the optical system. Also, the display control unit 116E also controls a position of the display 113 along with the shift control of the spectacle lens unit 101. Accordingly, a center in the horizontal direction of the image is made coincident with the eye of the observer and the positional gap between the optical system and the eye of the observer is corrected.

Detail description of the other parts of the HMD 100E illustrated in FIG. 10 is omitted. However, the other parts are configured and operate similarly to those of the HMD 100A illustrated in FIG. 5. As described, in the HMD 100E illustrated in FIG. 10, based on a detection result of the positional relationship between the optical system and the eye of the observer, shift control of the optical system is performed and the positional gap between the optical system and the eye of the observer is mechanically corrected. Thus, correction of the positional gap between the optical system and the eye of the observer can be performed appropriately.

<7. Seventh Embodiment>
[Configuration Example of Head-Mounted Display (Monocular)]

Figure 11:
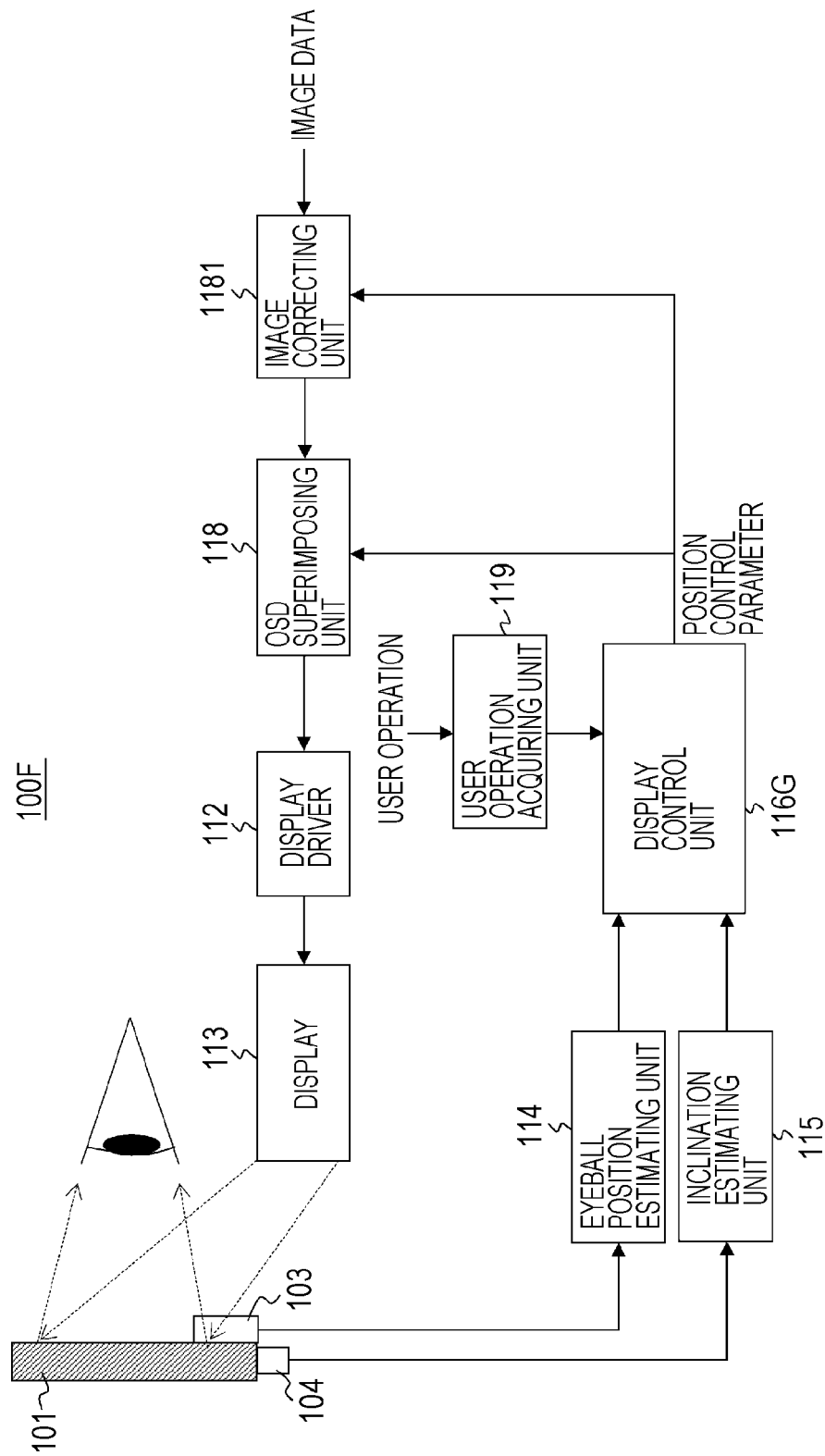
FIG. 11 is a view illustrating a schematic configuration example of an optical transmission head-mounted display (monocular) as a seventh embodiment.

FIG. 11 is a view illustrating a schematic configuration example of an optical transmission head-mounted display (HMD) 100F as the seventh embodiment. This configuration example is a monocular HMD. In FIG. 11, the same sign is assigned to apart corresponding to FIG. 6 or FIG. 9 and detail description of the part will be omitted arbitrarily.

Since the HMD 100F is a monocular HMD, the HMD 100F includes one spectacle lens unit 101 while the HMD 100B illustrated in FIG. 6 includes two spectacle lens units 101L and 101R. To the spectacle lens unit 101, an infrared sensor 103 is attached. The infrared sensor 103 functions similarly to the infrared sensors 103L and 103R in the HMD 100B illustrated in FIG. 6 and transmits a sensor output therefrom to an eyeball position estimating unit 114. Also, to the spectacle lens unit 101, a gyro sensor 104 to detect an inclination of an optical system including the spectacle lens unit 101 is attached. The gyro sensor 104 transmits a sensor output therefrom to an inclination estimating unit 105.

Also, since the HMD 100F is a monocular HMD, the HMD 100F includes a display driver 112 and a display 113 of one system. The display 113 is driven by the display driver 112 and displays an image. Light from the image displayed on the display 113 is reflected by the spectacle lens unit 101 and reaches an eye of an observer (left eye or right eye). Accordingly, the image displayed on the display 113 is optically magnified by the spectacle lens unit 101 and is observed as a magnified virtual image by the eye of the observer.

Similarly to the eyeball position estimating unit 114 in the HMD 100B in FIG. 6, based on the sensor output from the infrared sensor 103, the eyeball position estimating unit 114 estimates an eyeball position of the eye of the observer and outputs an angle ω, of when scanning of a cornea (black part of eye) is performed, as an estimation result of the eyeball position (see FIG. 2 and FIG. 3). Also, similarly to the inclination estimating unit 115 in the HMD 100B in FIG. 6, based on the sensor output from the gyro sensor 104, the inclination estimating unit 115 estimates an inclination θ in a horizontal direction of the optical system including the spectacle lens unit 101 (see FIG. 3).

The display control unit 116F calculates a positional gap d of the optical system relative to the eye of the observer based on the estimation result of the eyeball position and the estimation result of the inclination of the optical system. With reference to FIG. 3, the positional gap d corresponds to dL/cos θ or dR/cos θ. The display control unit 116F outputs a display signal for OSD display of the positional gap d or OSD display to prompt a user to perform operation of correcting the positional gap d and supplies the display signal to an OSD superimposing unit 118. Accordingly, the OSD display is performed on the displays 113.

By an observer, correction operation to make the positional gap d into zero is performed based on the OSD display. The user operation acquiring unit 119 acquires the user operation and transmits the acquired user operation to the display control unit 116F. Based on the correction operation, the display control unit 116F performs shift control of a display position of the image displayed on the display 113. Accordingly, a center in the horizontal direction of the image is made coincident with the eye of the observer and the positional gap between the optical system and the eye of the observer is corrected.

As described above, in the HMD 100F illustrated in FIG. 11, based on a detection result of the positional relationship between the optical system and the eye of the observer, OSD display of the positional gap between the optical system and the eye of the observer is performed. Based on the OSD display, correction operation is performed by the observer to eliminate the positional gap. Then, according to the correction operation, shift control of the display position of the image is performed and the positional gap between the optical system and the eye of the observer is electronically corrected. Thus, correction of the positional gap between the optical system and the eye of the observer can be performed appropriately.

<8. Eighth Embodiment>
[Configuration Example of Head-Mounted Display (Monocular)]

Figure 12:
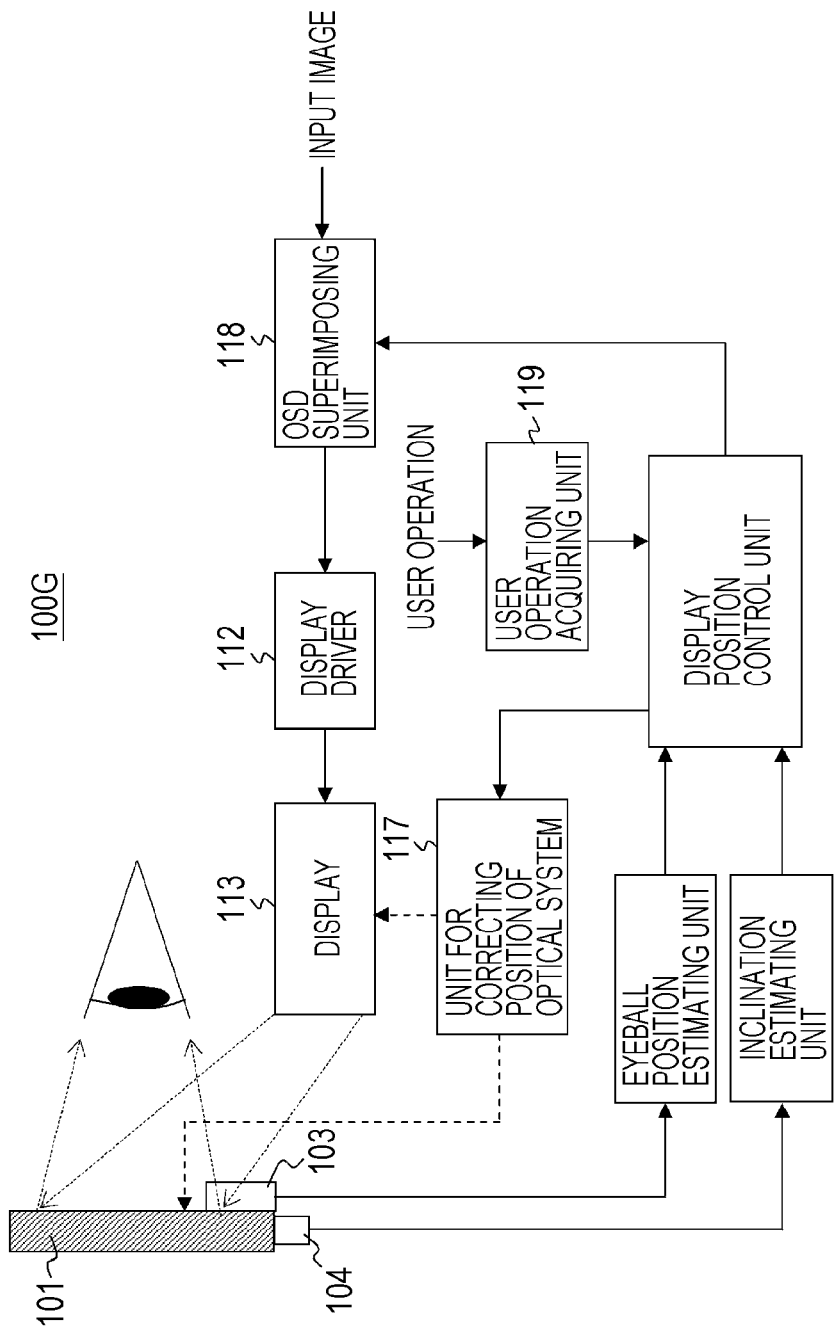
FIG. 12 is a view illustrating a schematic configuration example of an optical transmission head-mounted display (monocular) as an eighth embodiment.
Figure 14:
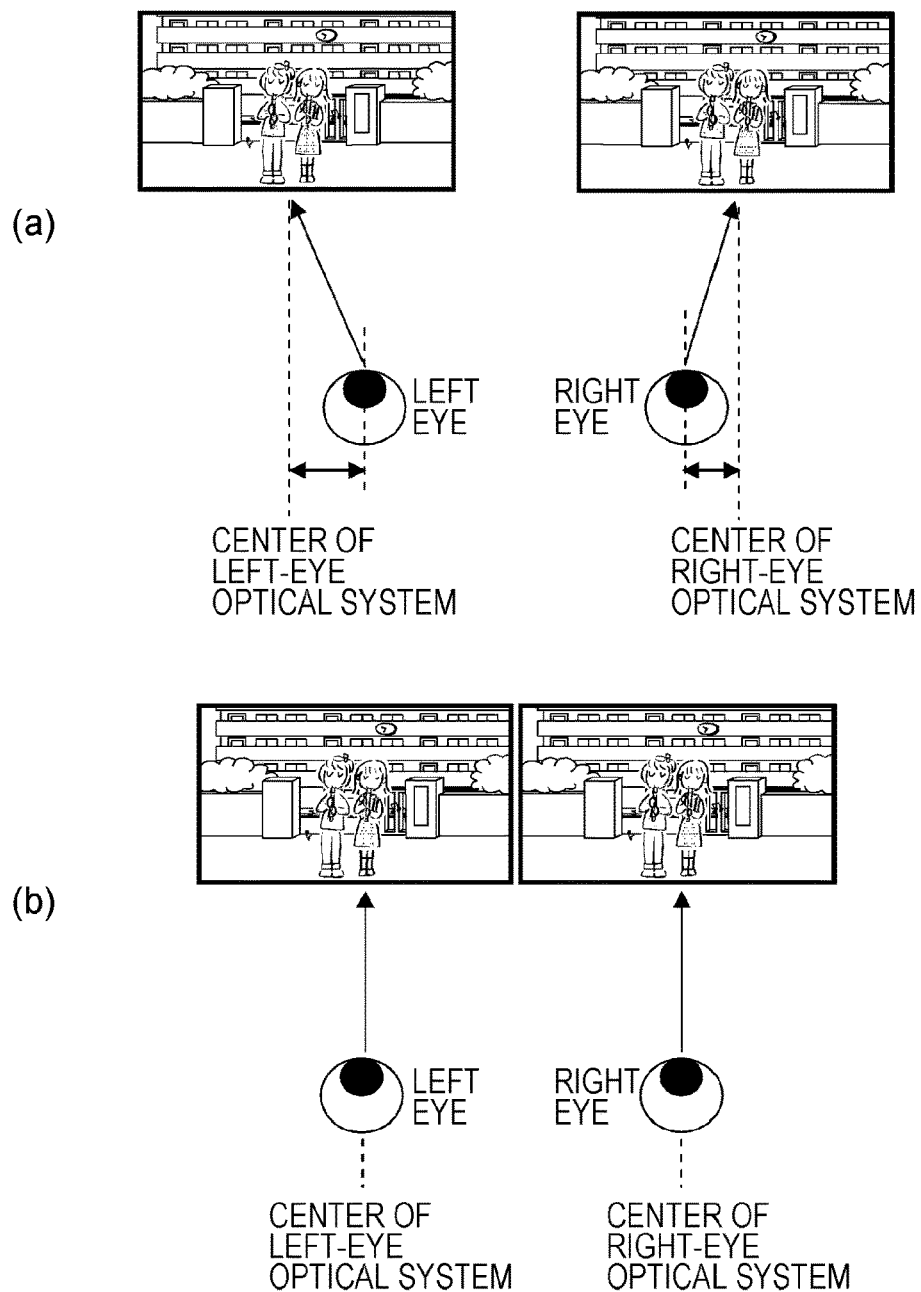
FIG. 14(a) and FIG. 14(b) are views for describing a conventional head-mounted display.

FIG. 12 is a view illustrating a schematic configuration example of an optical transmission head-mounted display (HMD) 100G as the eighth embodiment. This configuration example is a monocular HMD. In FIG. 12, the same sign is assigned to apart corresponding to FIG. 8 or FIG. 9 and detail description of the part will be omitted arbitrarily.

Since the HMD 100G is a monocular HMD, the HMD 100G includes one spectacle lens unit 101 while the HMD 100C illustrated in FIG. 8 includes two spectacle lens units 101L and 101R. To the spectacle lens unit 101, an infrared sensor 103 is attached. The infrared sensor 103 functions similarly to the infrared sensors 103L and 103R in the HMD 100C illustrated in FIG. 8 and transmits a sensor output therefrom to an eyeball position estimating unit 114. Also, to the spectacle lens unit 101, a gyro sensor 104 to detect an inclination of an optical system including the spectacle lens unit 101 is attached. The gyro sensor 104 transmits a sensor output therefrom to an inclination estimating unit 105.

Also, since the HMD 100G is a monocular HMD, the HMD 100G includes a display driver 112 and a display 113 of one system. The display 113 is driven by the display driver 112 and displays an image. Light from the image displayed on the display 113 is reflected by the spectacle lens unit 101 and reaches an eye of an observer (left eye or right eye). Accordingly, the image displayed on the display 113 is optically magnified by the spectacle lens unit 101 and is observed as a magnified virtual image by the eye of the observer.

Similarly to the eyeball position estimating unit 114 in the HMD 100C in FIG. 8, based on the sensor output from the infrared sensor 103, the eyeball position estimating unit 114 estimates an eyeball position of the eye of the observer and outputs an angle ω, of when scanning of a cornea (black part of eye) is performed, as an estimation result of the eyeball position (see FIG. 2 and FIG. 3). Also, similarly to the inclination estimating unit 115 in the HMD 100C in FIG. 8, based on the sensor output from the gyro sensor 104, the inclination estimating unit 115 estimates an inclination θ in a horizontal direction of the optical system including the spectacle lens unit 101 (see FIG. 3).

The display control unit 116G calculates a positional gap d of the optical system relative to the eye of the observer based on the estimation result of the eyeball position and the estimation result of the inclination of the optical system. With reference to FIG. 3, the positional gap d corresponds to dL/cos θ or dR/cos θ. The display control unit 116G outputs a display signal for OSD display of the positional gap d or OSD display to prompt a user to perform operation of correcting the positional gap d and supplies the display signal to an OSD superimposing unit 118. Accordingly, the OSD display is performed on the displays 113.

By an observer, correction operation to make the positional gap d into zero is performed based on the OSD display. The user operation acquiring unit 119 acquires the user operation and transmits the acquired user operation to the display control unit 116G. Based on the correction operation, the display control unit 116G controls a unit for correcting a position of an optical system 117 and performs shift control of a position of the optical system, that is, a position of the spectacle lens unit 101 and a position of the display 103. Accordingly, a center in the horizontal direction of the optical system is made coincident with the eye of the observer and the positional gap between the optical system and the eye of the observer is corrected.

As described above, in the HMD 100G illustrated in FIG. 12, based on a detection result of the positional relationship between the optical system and the eye of the observer, OSD display of the positional gap between the optical system and the eye of the observer is performed. Based on the OSD display, correction operation is performed by the observer to eliminate the positional gap. Then, according to the correction operation, shift control of the optical system is performed and the positional gap between the optical system and the eye of the observer is mechanically corrected. Thus, correction of the positional gap between the optical system and the eye of the observer can be performed appropriately.

<9. Modification>

Note that in the above-described embodiments, correction accuracy is improved by taking the inclination θ of the optical system into consideration. However, a simplified configuration in which the inclination θ of the optical system is not taken into consideration may also be considered. In such a case, components such as the gyro sensor 104 and the inclination estimating unit 115 are not necessary.

Also, in the above-described embodiments, an example in which a gy sensor 104 estimates the inclination θ of the whole optical system based on the sensor output from the gy sensor 104 attached to the spectacle lens unit 101L has been described. However, a configuration in which an inclination of the optical system on each of the left-eye side and the right-eye side is detected may also be considered. In such a case, a gyro sensor is attached not only to the spectacle lens unit 101L but also to the spectacle lens unit 101R.

Also, in the above-described embodiments, an example in which the positional gap in the horizontal direction between the optical system and the eye of the observer is corrected by performing shift control, in the horizontal direction, of the left-eye image and the right-eye image respectively displayed on the displays 113L and 113R has been described. Although detail description is omitted, it may also be considered to correct a positional gap between the optical system and the eye of the observer in a vertical direction in a similar manner.

Also, in the above-described embodiments, an example in which one infrared sensor is attached to each spectacle lens unit and scanning operation is performed with a weak infrared ray emitted to a side of the observer has been described. However, for example, as illustrated in FIG. 13(a), a configuration in which a plurality of infrared sensors IRS is attached to a spectacle lens unit GL and a position of the eye of the observer is determined comprehensively based on a sensor output from each of the infrared sensors IRS may also be considered. In such a case, when there are a great number of the infrared sensors IRS, it becomes unnecessary to perform the scanning operation with a weak infrared ray emitted from each of the infrared sensors IRS to the side of the observer.

Also, in the above-described embodiment, an example in which an infrared sensor is attached to each spectacle lens unit has been described. However, as illustrated in FIG. 13(b), by using a reflection sheet RS, it is also possible to install the infrared sensor IRS to a place which is away from the spectacle lens unit GL for a certain degree. Note that even in this case, as illustrated in FIG. 13(c), a configuration in which a plurality of infrared sensors IRS is arranged and a position of the eye of the observer is determined comprehensibly based on a sensor output from each of the infrared sensors IRS may also be considered.

Also, in the above-described embodiments, an example in which a display position of an image is shifted in the horizontal direction in the image correcting unit 111 has been described. To be exact, it may be further considered to perform correction of a position by a shift, rotation, magnification, contraction or the like in a vertical direction.

Also, in the above-described embodiments, estimation of an eyeball position has been performed by application of the sclera reflection method. However, application of a different technique such as an electro-oculogram (EOG) method or a facial recognition technique may also be considered.

Also, in the above-described embodiments, an example in which OSD display of a positional relationship (such as difference s or positional gap d) detected by the positional relationship detecting unit is displayed on a display for displaying an image has been described. However, the positional relationship may be displayed on a display element which is different from the display for displaying an image. Also, along with or instead of these, the positional relationship may be presented by sound, vibration, or increasing/decreasing intensity of light emission.

For example, in a case of using the vibration, a vibrator is installed and vibration becomes stronger as an amount of the positional gap becomes larger. Also, for example, in a case of using the sound, a gap amount or an operation method is reproduced or a volume becomes larger as a gap amount becomes larger.

Also, in the above-described embodiments, an example in which the present technique is applied to an HMD has been described. However, the present technique is not limited to the above and may be widely applied to a different image display apparatus such as a finder of a camera or a pair of electronic binoculars.

Also, the present technique may include the following configurations.

(1) An image display apparatus including: a positional relationship detecting unit configured to detect a positional relationship between an optical system, which leads an image displayed on a display element to an eye of an observer, and the eye of the observer based on an eyeball position of the eye of the observer; and a positional relationship correcting unit configured to correct the positional relationship between the optical system and the eye of the observer based on the positional relationship detected by the positional relationship detecting unit.

(2) The image display apparatus according to (1), wherein the positional relationship correcting unit shifts a display position of the image displayed on the display element based on the positional relationship detected by the positional relationship detecting unit.

(3) The image display apparatus according to (1), wherein the positional relationship correcting unit moves the optical system based on the positional relationship detected by the positional relationship detecting unit.

(4) The image display apparatus according to (1), wherein the positional relationship correcting unit includes a positional relationship presenting unit configured to present, to the observer, the positional relationship detected by the positional relationship detecting unit, and a control unit configured to control the positional relationship between the optical system and the eye of the observer according to operation by the observer.

(5) The image display apparatus according to (4), wherein the control unit performs shift control of a display position of the image displayed on the display element according to the operation by the observer.

(6) The image display apparatus according to claim 4), wherein the control unit performs movement control of the optical system according to the operation by the observer.

(7) The image display apparatus according to any of (4) to (6), wherein the positional relationship presenting unit displays, on the display element, the positional relationship detected by the positional relationship detecting unit.

(8) The image display apparatus according to any of (1) to (7), further including an inclination estimating unit configured to estimate an inclination of the optical system, wherein the positional relationship detecting unit detects the positional relationship between the optical system and the eye of the observer based on the estimated eyeball position and the estimated inclination.

(9) The image display apparatus according to any of (1) to (8), further including an optical system configured to lead, to the eye of the observer, the image displayed on the display element.

(10) The image display apparatus according to (9), wherein as the optical system, there are a first optical system configured to lead, to a left eye of the observer, a left-eye image displayed on the display element and a second optical system configured to lead, to a right eye of the observer, a right-eye image displayed on the display element.

(11) The image display apparatus according to (9) or (10), further including an eyeball position estimating unit configured to estimate an eyeball position of the eye of the observer, wherein the positional relationship detecting unit detects the positional relationship between the optical system and the eye of the observer based on the eyeball position estimated by the eyeball position estimating unit.

(12) A method for displaying an image including: a positional relationship detection step of detecting a positional relationship between an optical system, which leads an image displayed on a display element to an eye of an observer, and the eye of the observer; and a positional relationship correction step of correcting the positional relationship between the optical system and the eye of the observer based on the detected positional relationship.

REFERENCE SIGNS LIST 100, 100A to 100G head-mounted display
101, 101L, 101R spectacle lens unit
102 connection member
103, 103L, 103R infrared sensor
104 gyro sensor
111 image correcting unit
112, 112L, 112R display driver
113, 113L, 113R display
114 eyeball position estimating unit
115 inclination estimating unit
116, 116A to 116G display control unit
117 unit for correcting a position of an optical system
118 OSD superimposing unit
119 user operation acquiring unit
122 optical system adjusting mechanism

The invention claimed is:

1. An image display apparatus, comprising:
   an inclination estimation unit configured to estimate an inclination of an optical system with respect to an eye of an observer in a horizontal direction;
   a positional relationship detecting unit configured to detect a positional relationship between the optical system and the eye of the observer based on an eyeball position of the eye of the observer and the inclination of the optical system, wherein the optical system is configured to lead an image displayed on a display element to the eye of the observer; and
   a positional relationship correcting unit configured to correct the positional relationship between the optical system and the eye of the observer based on the positional relationship detected by the positional relationship detecting unit.

2. The image display apparatus according to claim 1, wherein the positional relationship correcting unit is further configured to shift a display position of the image displayed on the display element based on the positional relationship detected by the positional relationship detecting unit.

3. The image display apparatus according to claim 1, wherein the positional relationship correcting unit is further configured to move the optical system based on the positional relationship detected by the positional relationship detecting unit.

4. The image display apparatus according to claim 1, wherein the positional relationship correcting unit further includes:
   a positional relationship presenting unit configured to present, to the observer, the positional relationship detected by the positional relationship detecting unit, and
   a control unit configured to control the positional relationship between the optical system and the eye of the observer based on an operation by the observer.

5. The image display apparatus according to claim 4, wherein the control unit is further configured to shift a display position of the image displayed on the display element based on the operation by the observer.

6. The image display apparatus according to claim 4, wherein the control unit is further configured to control movement of the optical system based on the operation by the observer.

7. The image display apparatus according to claim 4, wherein the positional relationship presenting unit is further configured to display, on the display element, the positional relationship detected by the positional relationship detecting unit.

8. The image display apparatus according to claim 1, further comprising the optical system.

9. The image display apparatus according to claim 8, further comprising an eyeball position estimating unit configured to estimate the eyeball position of the eye of the observer.

10. The image display apparatus according to claim 8, wherein the optical system includes:
    a first optical system configured to lead, to a left eye of the observer, a left-eye image displayed on the display element; and
    a second optical system configured to lead, to a right eye of the observer, a right-eye image displayed on the display element.

11. The image display apparatus according to claim 10, wherein the positional relationship between the first optical system relative to the left eye of the observer and the positional relationship between the second optical system relative to the right eye of the observer is calculated based on a first inclination of the first optical system with respect to the left eye and a second inclination of the second optical system with respect to the right eye.

12. The image display apparatus according to claim 1, wherein the inclination of the optical system is detected by a gyro sensor.

13. The image display apparatus according to claim 1, wherein the display element is configured to display an amount of positional gap between the optical system and the eye of the observer.

14. A method, comprising:
   estimating an inclination of an optical system with respect to an eye of an observer in a horizontal direction;
   detecting a positional relationship between the optical system and the eye of the observer based on an eye ball position of the eye of the observer and the inclination of the optical system, wherein the optical system leads an image displayed on a display element to the eye of the observer; and
   correcting the positional relationship between the optical system and the eye of the observer based on the detected positional relationship.

* * * * *